United States Patent [19]

Gidseg

[11] Patent Number: 4,820,372

[45] Date of Patent: Apr. 11, 1989

[54] APPARATUS AND SYSTEM FOR FABRICATING REFRIGERATION CABINETS

[76] Inventor: Edward Gidseg, 87-77 Lefferts Blvd., Richmond Hill, N.Y. 11418

[21] Appl. No.: 45,905

[22] Filed: May 1, 1987

Related U.S. Application Data

[62] Division of Ser. No. 608,189, May 9, 1984, Pat. No. 4,676,852.

[51] Int. Cl.$^4$ .............................................. B05C 7/00
[52] U.S. Cl. ...................................... 156/356; 156/64; 156/79; 156/293; 156/367; 156/423; 264/46.5; 312/214; 425/147
[58] Field of Search ................... 156/79, 293, 423, 64, 156/356, 367; 264/46.5; 269/48.1; 312/214; 425/147

[56] References Cited

U.S. PATENT DOCUMENTS

| | | |
|---|---|---|
| 3,152,199 | 10/1964 | Roberts . |
| 3,155,751 | 11/1964 | Morris . |
| 3,288,896 | 11/1966 | Hendricks . |
| 3,380,615 | 4/1968 | Kessler . |
| 3,410,931 | 11/1968 | Johnson . |
| 3,432,378 | 3/1969 | Gondek et al. . |
| 3,444,280 | 5/1969 | Pulaski . |
| 3,504,069 | 3/1970 | Borghi . |
| 3,551,947 | 1/1971 | Jennings .......................... 425/147 X |
| 3,633,783 | 1/1972 | Aue . |
| 3,684,342 | 8/1972 | Jansen . |
| 3,794,396 | 2/1974 | Vick . |
| 3,880,415 | 4/1975 | Fujioka et al. ...................... 269/48.1 |
| 3,904,721 | 9/1975 | Puterbaugh . |
| 4,012,186 | 3/1977 | Ramazzotti . |
| 4,053,972 | 10/1977 | Kordes . |
| 4,082,825 | 4/1978 | Puterbaugh . |
| 4,099,812 | 7/1978 | Morphy . |
| 4,162,571 | 7/1979 | Horvay . |
| 4,411,413 | 10/1983 | Reidenbach ...................... 269/48.1 |

Primary Examiner—Robert A. Dawson
Attorney, Agent, or Firm—Pennie & Edmonds

[57] ABSTRACT

An apparatus and system is disclosed for fabricating refrigeration cabinets of the type including an outer shell and inner shell separated by an insulating medium, such as polyurethane foam. The inner and outer shells are each formed of a plurality of plates which, according to the invention, are maintained in their respective relative positions long enough to permit the insulating medium forming components to be introduced therebetween and to cure and adhere to the plates so as to thereafter maintain the plurality of plates in their predetermined relative positions as an integral cabinet without the need for prior securement. A novel thermal insulating member is also disclosed which extends along the forward marginal portions of the inner shell to prevent heat transfer between the inside of the refrigeration cabinet and the outside atmosphere during operation, while simultaneously maintaining electrical wires connected to the electrical system of the cabinet, or tubing for fluids or gases depending upon the installation in secured and hidden locations. Novel methods and systems are also disclosed for fabricating general purpose cabinets as well as refrigeration cabinets.

83 Claims, 11 Drawing Sheets

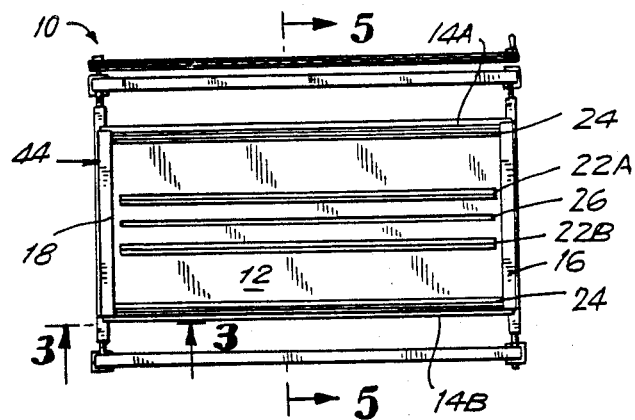
FIG.2
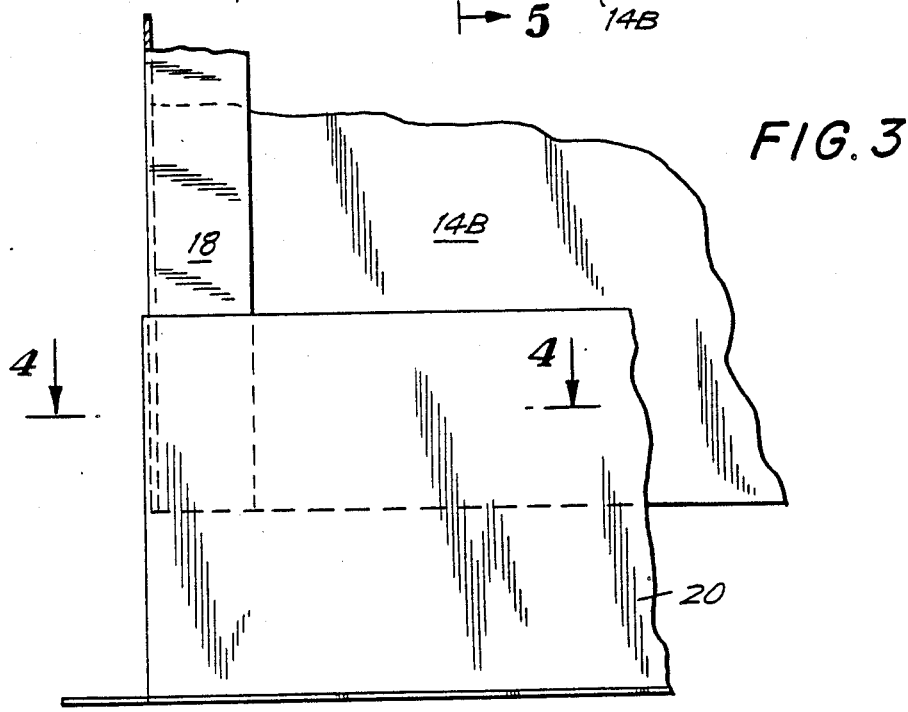
FIG.3
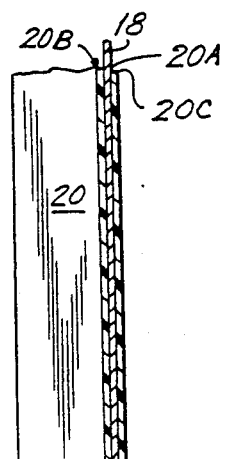
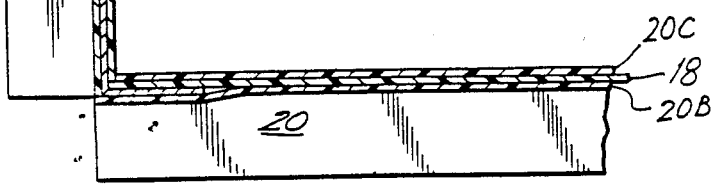
FIG.4

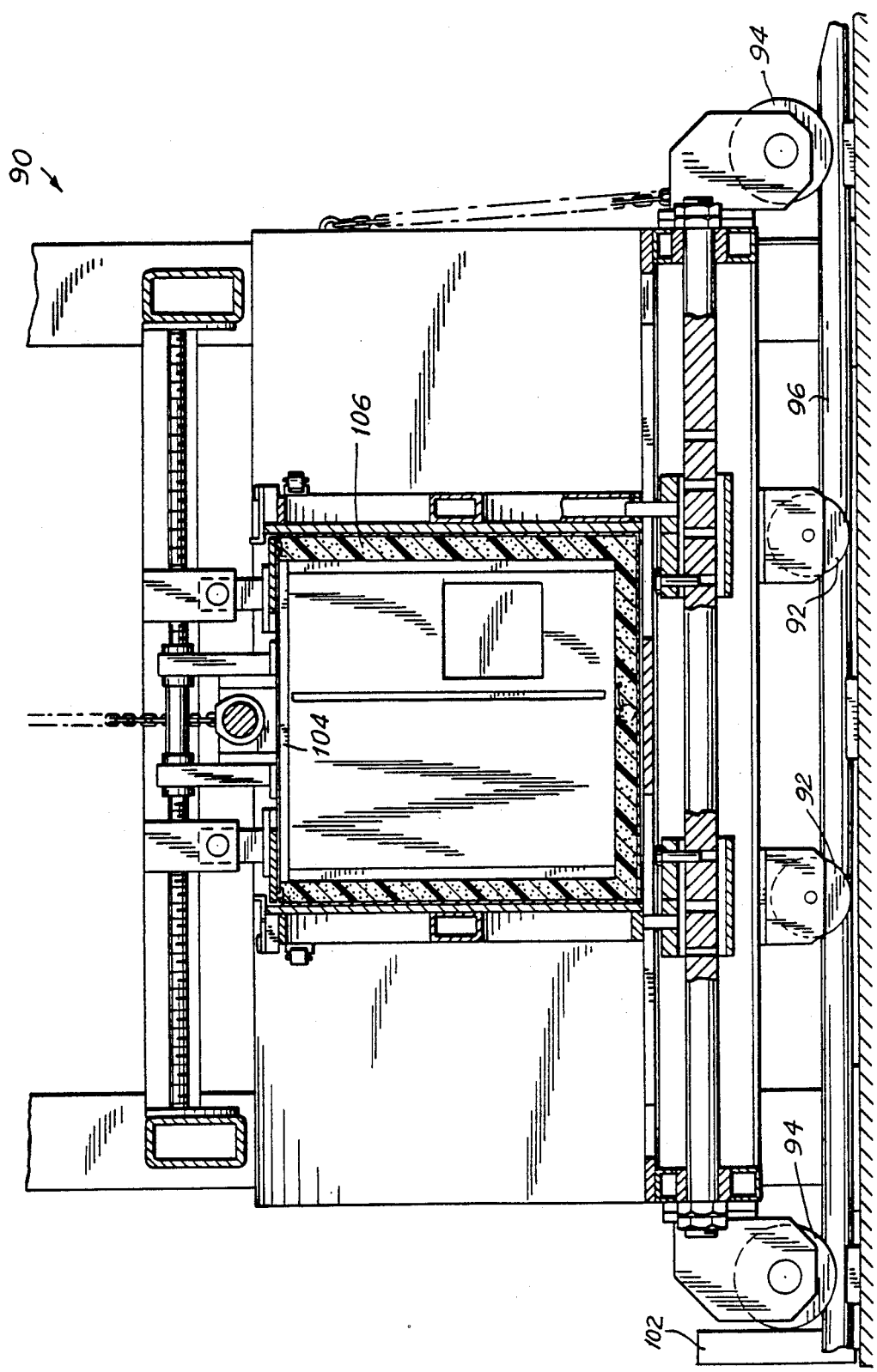

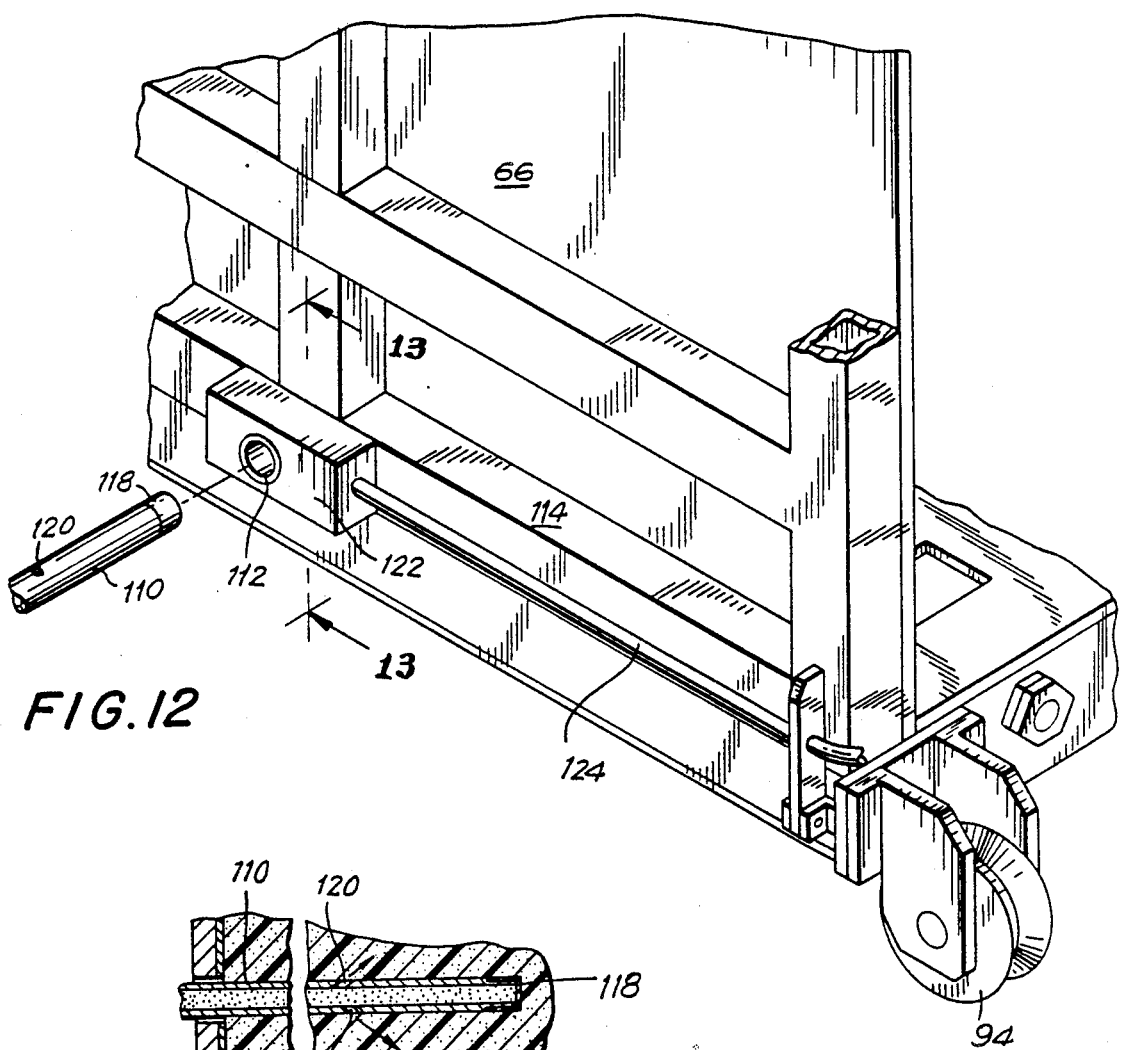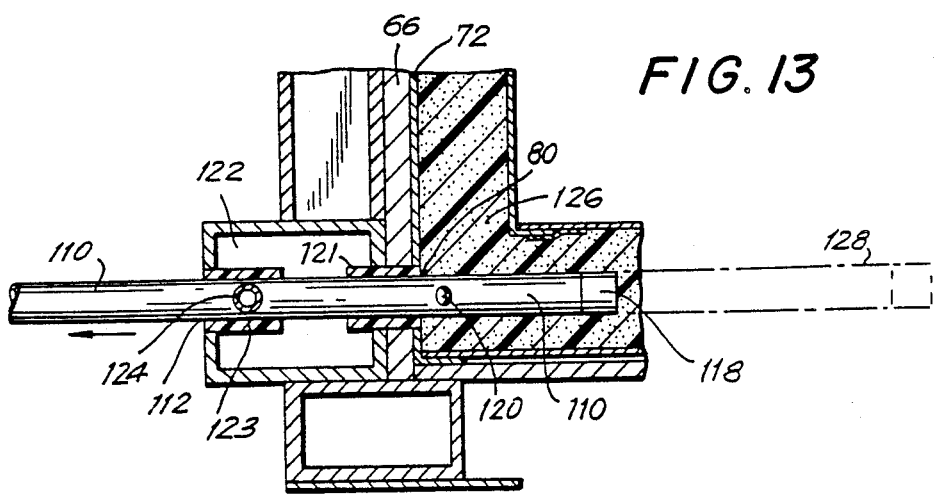

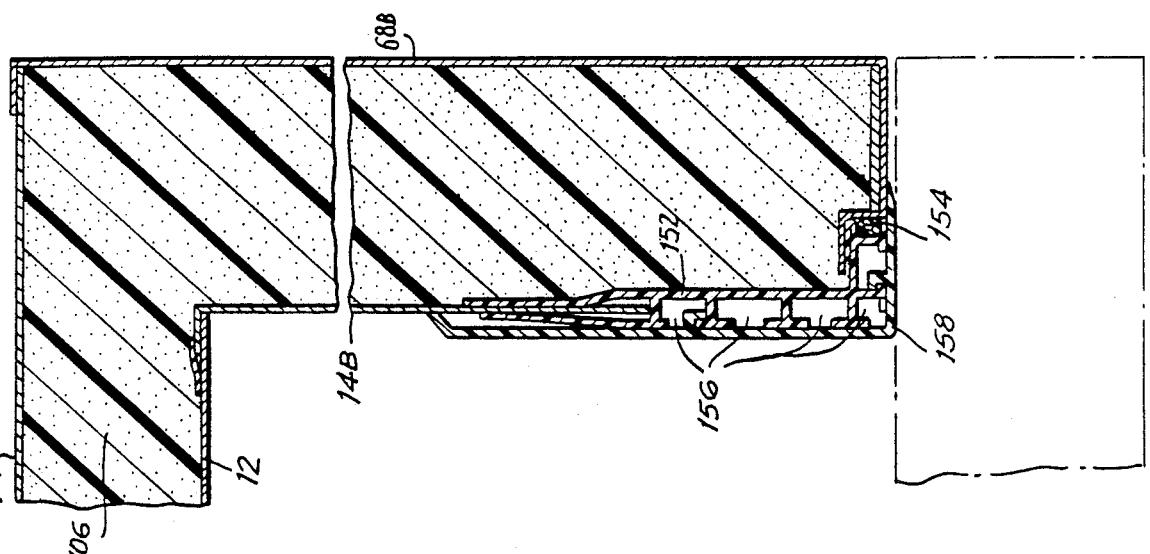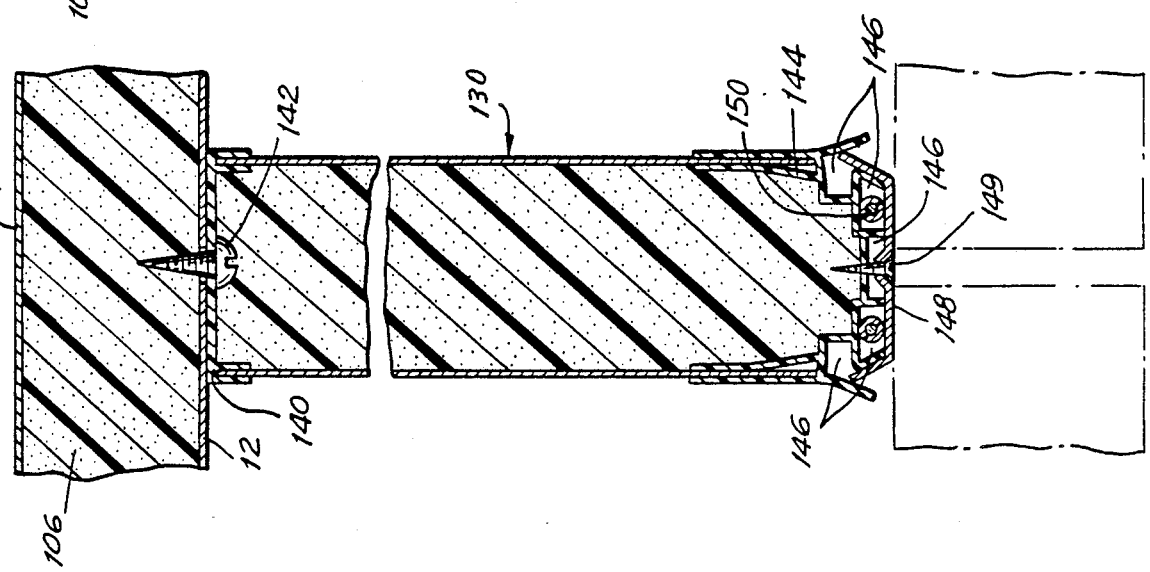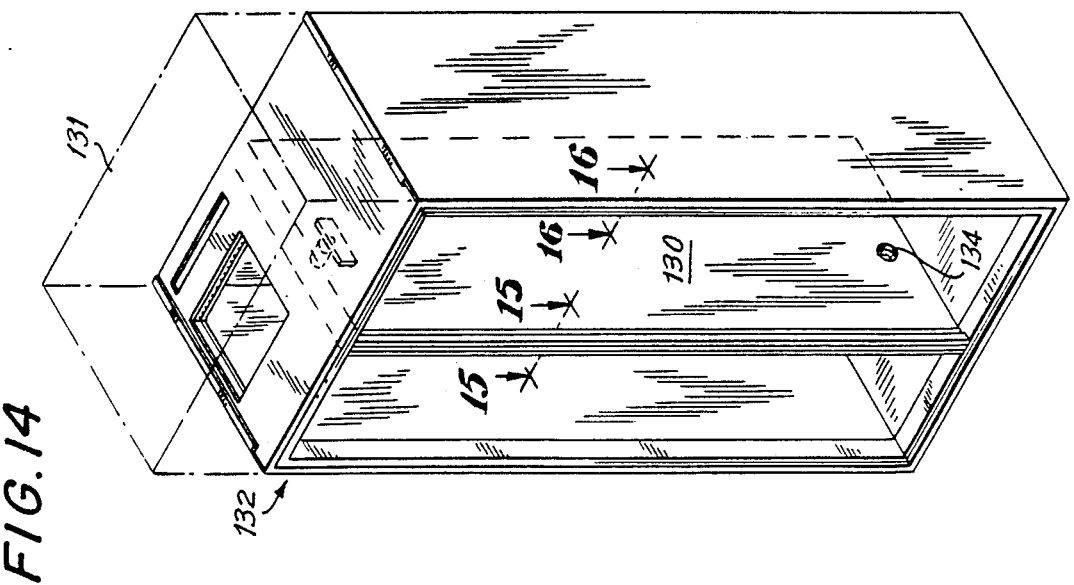

APPARATUS AND SYSTEM FOR FABRICATING REFRIGERATION CABINETS

This is a division, of application Ser. No. 608,189 filed May 9, 1984, now U.S. Pat. No. 4,676,852.

TECHNICAL FIELD

This invention relates to an apparatus and novel manufacturing technique for producing insulated cabinets such as those used for refrigerators and freezers. More generally, the invention contemplates the production of all types of double walled cabinets including those cabinets used for heating units, ovens, or similar items where the inner portion of the cabinet must be separated and insulated from the outer portion, by a medium which adheres to both the inner and outer portions.

BACKGROUND ART

According to the prior art techniques, metal cabinets are constructed by assembling steel sheets in an overlapping fashion to form a box-like arrangement. These sheets are then spot welded or otherwise joined to produce a permanently joined structure.

In certain situations, an outer box is first assembled by arranging metal sheets in an overlapping fashion to form a box-like structure. This structure is made permanent by welding, riveting, or otherwise joining the outer box components in their assembled relation. At the time of joining these components, care must be taken to maintain the desired arrangement of plates and dimensions of the cabinet. If necessary, stiffeners or other reinforcement can be added to the inside or outside of the outer box structure.

After the outer box is permanently assembled, an inner box can be assembled by arranging metal or plastic sheets in an overlapping fashion to form a box-like arrangement having smaller dimenisons than the outer box. Then, after adding any insulation, fillers, fire resistant components or other materials to the inside of the outer box, the inner box joined by welding, adhesively bonding or other suitable joining methods, and is placed inside of the outer box.

To finish construction of the cabinet, the inner box is connected to the outer box. For certain cabinets, such as file cabinets, this is accomplished by mating the inner and outer box metal panels and spot welding them together. In certain situations, an adhesive, foam, or other medium capable of adhering to the inner and outer box members is introduced and allowed to cure or polymerize.

One particular industry which uses a variation of the outer box/inner box cabinet fabrication is the refrigeration industry. Refrigeration cabinets are constructed of an inner box section positioned within an outer box section and dimensioned to define an approximately 2" space between the box sections. This 2" space is then filled with an insulating medium, such as a relatively high density polyurethane foam, which is formed in situ between the box sections when they are positioned within supporting molds.

An outer box section is first assembled by assembling steel sheets in an overlapping fashion to form a box-like arrangement. Thereafter, the sheets are spot welded so as to be retained in an assembled relation. An inner box section is then fabricated in the same manner as the outer box section. Thereafter, the outer box section is positioned within a rigid steel jig which defines a cavity by steel side walls against which the outer box section is snugly positioned. It is important to provide high strength lateral support for the walls of the outer box section for reasons which will be explained below.

The inner box section is subsequently positioned within the outer box section and a high strength mold or jig is positioned within the cavity defined by the inner box section. When the two box sections are thus positioned, movement of either the outer box section outward or the inner box section inward is completely prevented. Next, polyurethane foam forming materials are injected into the space between the inner and outer box sections.

This high density polyurethane foam expands and exerts pressure against the inner and outer box sections. The forces which are generated by the foam forming materials against the inner and outer box sections are very substantial and in the absence of a mold jig having very high strength support walls, the stainless steel sheet materials forming the inner and outer box sections would buckle inwardly and outwardly respectively. The forces provided by the foam forming materials are so high that they would substantially distort the shape of the box sections.

Hence, a mold jig is required that has walls which can provide uniformly distributed support over all surfaces of the inner and outer steel sheet metal members of the refrigeration cabinet during the time period that the insulating foam material is expanding. Then, since movement of the box sections is prohibited, the foam expands to fill the cavity between the sections. Also, the foam provides thermal insulation of one section from the other.

The techniques thus far discussed for producing refrigeration cabinets utilize the steps of assembling and spot welding the steel plates on a separate jig, and require careful attention to the dimensions of the unit during welding. In addition, storing the inner and outer boxes prior to the fabrication of the refrigerator requires a great amount of space, which space is not always readily available and which is costly to provide.

I have invented an apparatus, method and system which avoids these disadvantages while reducing the cost of production of the refrigeration cabinet.

SUMMARY OF THE INVENTION

An apparatus is disclosed for fabricating cabinets, preferably refrigeration cabinets, of the type including an outer shell and an inner shell separated by an adhering medium, which comprises means for receiving and supporting a plurality of components in a predetermined arrangement forming the outer shell and a plurality of components in a predetermined arrangement forming the inner shell within the outer shell so as to define a space therebetween for reception of the adhering medium, means for maintaining the predetermined arrangement of the inner shell components while positioned within the outer shell, and means for introducing the adhering medium into the space defined between the inner and outer shells so as to adhere to the respective inner and outer shell components and retain them in their predetermined relative arrangements.

Adhering medium includes any substance or substances which can be introduced into the space between the inner and outer shells in a liquid state, and which is capable of holding the shells together after polymerizing, curing, or setting. Since the preferred embodiment of the invention contemplates refrigerators having inner and outer shells being exposed to different temperatures, it is necessary for this adhering medium to have thermal insulating properties, along with the internal or cohesive strength necessary to hold the shells together.

In the preferred embodiment, the adhering medium is a thermal insulating medium, such as a polyurethane foam. This foam is formed by introducing polymerizable foam forming components into the space defined between the inner and outer shells. These components react, expand and then cure to form a thermal insulating barrier between the inner and outer shells. This foam adheres to the respective inner and outer shell components and retains them in their predetermined relative arrangements. By the use of the adhering medium according to the invention, welding or other securement of the outer or inner shells is unnecessary.

In this apparatus, the means for supporting a plurality of components in a predetermined arrangement to form the outer shell preferably comprises a supporting fixture having a plurality of supporting members capable of being arranged to support the outer shell components in the predetermined arrangement. This supporting fixture comprises a base support plate for contacting support with a component of the outer shell and a plurality of upright respectively opposed support plates for contacting support respectively with other components of the outer shell.

The apparatus includes means to vary the dimension between at least two opposed support plates to accommodate outer shell components of different respective dimensions. Such means to vary the dimensions between at least two of the opposed support plates may be in the form of means to facilitate movement and means to lock at least one support plate in a predetermined position relative to the position of its opposed support plate.

The apparatus also includes means to facilitate pivotal rotation of at least one of the support plates about its lower portion to accommodate reception of the outer shell components and/or removal of the completed refrigeration cabinet. Such means to vary the dimension between at least two opposed support plates comprises means to facilitate movement and means to lock at least two support plates in a predetermined spaced relation.

The apparatus also includes means to facilitate movement and means to lock at least two pairs of the opposed support plates in predetermined relative respective spaced relation, along with means for pivotally rotating each of the support plates about its lower portion to accommodate reception of the outer shell components and/or removal of the completed refrigeration cabinet.

To facilitate assembly, it is helpful for the apparatus to include means for aligning the inner and outer shell supporting means with the means for maintaining the predetermined arrangement of the inner shell components. Such alignment means may comprise a plurality of rail wheels supporting the inner and outer shell supporting means on at least two fixed position rails for alignment with the means for maintaining the predetermined arrangement of the inner shell components.

A device is provided for suspending the means for maintaining the predetermined arrangement of the inner shell components in a manner so as to be movable into and out of the inner and outer shell supporting means may be included. Preferably, the means for maintaining the predetermined arrangement of the inner shell components is mounted on a frame and supported by the suspending means in the form of a motorized chain, movable upwardly and downwardly. Also, the means for maintaining the predetermined arrangement of the inner shell components preferably includes a plurality of support plates spaced by dimensions corresponding to the inner dimensions of the finished refrigerator cabinet.

The inner and outer shell supporting means of the apparatus can be further supportable on rollers capable of moving and supporting the supporting means on a substantially flat surface to facilitate assembly and movement along a shop floor, of the inner and outer shell components in their predetermined arrangement.

At least one of the support plates comprises means for introducing polymerizable thermal insulating medium forming components into the space defined between the inner and outer shells in order to form the thermal insulating medium therebetween. This means for introduction of the polymerizable thermal insulating medium forming components can preferably be an aperture extending through the lower portion of the bottom outer shell panel of the finished refrigerator cabinet and the corresponding supporting plate of the outer shell mold. The apparatus is respectively dimensioned for reception of a device capable of dispensing the polymerizable thermal insulating medium forming components.

The support plates of the means for maintaining the predetermined arrangement of the inner shell components are of sufficient strength to provide relatively uniformly distributed outward forces against the plate members of the inner shell in response to inward forces provided by the polymerization and expansion of the polymerizable thermal insulating medium forming components. Similarly, the support plates of the means for maintaining the predetermined arrangement of the outer shell components are of sufficient strength to provide relatively uniform inward forces against the plate members of the outer shell in response to outward forces provided by the polymerization and expansion of the polymerizable thermal insulating medium forming components.

The invention further facilitates storage of a substantial number of refrigeration cabinets by the fact that they may be stored for ultimate use by their separate components, namely, the sheets of steel or stainless steel which form their side, upper, lower, and rear walls, respectively. As will be discussed hereinbelow, the invention is not limited to the fabrication of the refrigerator cabinets and also discloses novel methods, systems, and apparatus for the general fabrication of a wide variety of cabinets.

It should also be noted that in addition to refrigeration cabinets, the present methods, systems, and apparatus are advantageously applicable to the production of all insulated cabinets such as those used for heating devices such as ovens, double wall cabinets having fire resistant properties, or any double walled cabinets having an adhering medium therebetween.

There is disclosed an apparatus for fabricating cabinets and particularly refrigeration cabinets, of the type including an outer shell and an inner shell separated by a polymerized thermal insulating foam, which comprises an outer shell mold for receiving and supporting a plurality of components in a predetermined arrangement to define the outer shell and a plurality of components in a predetermined arrangement to define the inner shell within the outer shell so as to also define a space therebetween for an adhering mediu, such as a thermal insulating foam, an inner shell mold for maintaining the predetermined arrangement of the inner shell components while positioned within the outer shell, and means for introducing polymerizable thermal insulating foam forming components into the space defined between the inner and outer shells so as to define a thermal insulating foam barrier between the inner and outer shells so as to simultaneously retain the respective inner and outer shell components in their predetermined relative arrangements.

This apparatus may also include one or more separate inner shell forming tables for arranging the inner shell components in a predetermined arrangement prior to introduction into the outer shell mold. The inner shell forming table comprises support members which are threadably mounted onto elongated threaded rods to permit changing the dimension of the forming table to facilitate production of inner shells of various sizes.

The inner shell mold can preferably be mounted on a frame and is movable into and out of the outer shell mold. This frame includes track members to stabilize the upward and downward movement of the inner shell mold.

The means for introducing polymerizable thermal insulating foam forming components is preferably in the form of an aperture extending through the outer shell mold and a correspondingly located aperture in one of the outer shell components. Also, the apparatus for fabricating refrigeration cabinets includes an apparatus for introducing the polymerizable thermal insulating foam forming components into the space defined by the inner and outer shells so as to form a thermal insulating foam therebetween.

The apparatus for introducing the polymerizable thermal insulating foam forming components is preferably a foam gun, which is connected to a computer control system for controlling the relative portions of the polymerizable thermal insulating foam forming components introduced into the space between the inner and outer shells to produce the required predetermined amount of thermal insulating foam necessary to at least substantially fill the space between the inner and outer shells. The computer control system is connected to a supply of the polymerizable thermal insulating foam forming components.

The foam gun also includes means for preventing leakage of the polymerizable thermal insulating foam forming components outside of the above-described apertures, as well as means for automatically introducing the foam gun into these apertures. The means for automatically introducing the foam gun into the apertures further comprises means for introducing a solvent to the foam gun for removing any excess polymerizable thermal insulating foam forming components gun before they can polymerize, expand, and plug the openings of the nozzle.

Another embodiment of the invention relates to an apparatus for fabricating refrigeration cabinets of the type including an outer shell and an inner shell each formed substantially of a plurality of plate members, the inner shell being separated from the outer shell by an adhering medium or thermal insulating foam. This apparatus comprises a first mold fixture for receiving and supporting a plurality of plate members in a predetermined arrangement forming the outer shell, a second mold fixture movable from positions into and out of the first mold fixture, an apparatus for dispensing an adhering medium which cures or sets to form an adhesive or preferably, polymerizable thermal insulating foam forming components which react to form a thermal insulating foam, within the space between the inner and outer shells, and means for supplying and controlling the amount and rate of the materials to be dispensed by the dispensing apparatus.

In the first mold fixture, the outer shell has a plate member defining a rear outer wall and four plate members extending substantially perpendicular to the rear outer wall plate member in end to end relation therewith about the periphery thereof to form respectively, a top outer wall, a bottom outer wall and two side outer walls, is formed. This outer shell has positioned therein an inner shell formed of a plurality of plate members, the inner shell plate members forming a rear inner wall and four plate members extending substantially perpendicular to the rear inner wall plate member along the periphery thereof. The dimensions of the rear inner wall plate member are less than the corresponding dimensions of the rear outer wall plate member such that the inner shell and the outer shell define a space therebetween for reception of the polyurethane foam (or other adhering medium) therein.

The inner shell also has extending along the forward peripheral portions, substantially non-heat conducting means to form a thermal barrier between the inner shell and the atmosphere outside the inner shell. The non-heat conducting means includes a bridging portion dimensioned, positioned and configured to extend across the space defined between said inner and outer shells at the forward marginal portion thereof. The end of the bridging portion distal from the inner shell being in contact with the forward peripheral portions of the outer shell.

The first mold fixture also includes a plurality of upright plate members, at least two of which are movable and lockable to spaced positions corresponding to the respective outer dimensions of the outer shell. The first mold fixture plate members are of sufficient strength to restrain uniformly the outer shell plate members against movements in outward directions.

The second mold fixture is movable from positions into and out of the first mold fixture. This second mold fixture has a main support having a plurality of downwardly extending plate members, at least two of which are movable and lockable to relative positions corresponding to the respective dimensions of the inner shell plate members. Also, the second mold fixture plate members are of sufficient strength to restrain uniformly, the inner shell plate members against movements in inward directions.

The apparatus also comprises at least one gun for dispensing the polyurethane foam forming components (or adhering medium) which sets or cures to form an adhesive or foam within the space between the inner and outer shells. The dispensing portion of this gun is positioned for automatic insertion and removal through an aperture defined by at least one of the upright plate members of the first mold fixture and also through an aperture defined by the corresponding plate member of the outer shell substantially in alignment with the first mentioned aperture. The dispensing portion of this gun is positionable within the space defined between the inner and outer shells.

This apparatus also includes means for supplying the adhering medium and for controlling the amount and rate of the adhering medium (or its forming components) to the gun for dispensing into the space defined by the inner and outer shells. This medium forms, upon setting or curing, an adhesive (or foam) which substantially fills the entire space therebetween and which adheres to the plate members defining the inner and outer shells.

The support members of the first and second mold fixtures are of sufficient strength and have continuous surfaces to maintain the corresponding respective contacting plate members of the inner and outer shells in a correspondingly substantially flat condition against the forces provided therebetween by introduction of the adhering medium during setting or curing. The bridging portion of the non-heat conducting means extending across the forward portion of the space defined by the inner and outer shells is positioned to prevent leakage of the adhering medium or foam such that upon final setting or curing, the adhering medium or foam adheres to the respective plate members of the inner and outer shells and retains them in their respective relative positions thereby substantially avoiding the need for other securing and retention means.

Another aspect of the invention relates to a system for fabricating cabinets, preferably refrigeration cabinets, of the type including an outer shell and an inner shell separated by an adhering medium which comprises means for supporting a plurality of components in a predetermined arrangement to form the inner shell, means for receiving and supporting a plurality of components in a predetermined arrangement to form the outer shell and the inner shell within the outer shell so as to define a space therebetween, means for maintaining the predetermined arrangement of the inner shell components while positioned within the outer shell, and means for introducing the adhering medium, preferably polyurethane foam forming components, into the space defined between the inner and outer shells so as to adhere to the respective inner and outer shell components and retain them in their predetermined relative arrangements.

The inner shell component supporting means is in the form of a forming table having inner shell top, bottom, rear, and side support members which are adjustably positioned so as to facilitate formation thereon of inner shells of various sizes.

This system also includes a plurality of spacer bars each connected at one end to one support member and selectively connectable at the other end to a support fixture to establish one dimension for the inner shell. At least one of these support members is pivotable inwardly to facilitate removal of the inner shell after formation thereon. Also, the support fixture is movable between two positions and further comprises linking means which correspondingly causes the pivotal movement of at least on support member.

Preferably, the outer and inner shell receiving and supporting means is an outer shell forming mold which is movable into and out of a polymerizable thermal insulation medium forming station and has outer shell top, bottom, rear, and side support members which are adjustably positioned so as to receive and support the outer shell components. These support members comprise a bottom wall for supporting the rear outer shell wall and four upright sidewalls for supporting respectively the top, bottom and two sidewalls of the outer shell.

The support walls of the outer shell forming mold are movable and lockable relative to each other to selectively adjust the spacing therebetween to facilitate formation therein of outer shells of various sizes. At least two of the support walls are pivotally rotatable to accommodate formation of the outer shell and removal of the completed refrigeration cabinet.

The means to facilitate movement of the outer shell forming mold into and out of the polymerizable thermal insulating medium forming station can be a plurality of rail wheels with at least two fixed position rails to facilitate movement to a position in alignment within the forming station.

At least one of the side support members of the outer shell mold and its correspondingly supported outer shell component each define an aperture for reception of a correspondingly positioned thermal insulating medium forming components introduction gun in alignment therewith when positioned within the forming station. This gun is connected to a supply of the polymerizable thermal insulating medium forming components and is further connected to computer control means capable of predetermining the requisite amounts and properties of the forming components necessary to substantially fill the space defined between the inner and outer shells.

The means for maintaining the predetermined arrangement of the inner shell components while positioned within the outer shell may be an inner shell mold mounted on a frame located in the forming station. This inner shell mold is suspended within the frame of the forming station and is movable upwardly and downwardly along vertical tracks to facilitate alignment with the outer shell forming mold when positioned in the forming station. Preferably, the inner shell mold frame is suspended within the forming station by a motor driven chain. The forming station also includes means for further alignment of the outer shell forming mold and inner shell mold within the outer shell forming mold.

The invention also contemplates a method for fabricating double walled cabinets, preferably refrigeration cabinets, having a medium between the inner and outer walls, of the type including an outer shell and an inner shell separated by an adhering medium, which comprises supporting a plurality of components in a predetermined arrangement forming the outer shell and a plurality of components in a predetermined arrangement forming the inner shell within the outer shell so as to define a space therebetween for an adhering medium, maintaining the predetermined arrangement of the inner shell components while positioned within the outer shell, and introducing the adhering medium, preferably polyurethane foam forming components, into the space defined between the inner and outer shells so as to adhere to the respective inner and outer shell components and retain them in their predetermined relative arrangements.

This method also includes the steps of first dimensioning a plurality of components so as to be capable of being arranged to form the inner shell, supporting the plurality of predimensioned components in a predetermined arrangement to form the inner shell prior to supporting the inner shell within said outer shell, dimensioning a plurality of components so as to be capable of being arranged to form the outer shell, arranging and supporting the plurality of predimensioned components to form the outer shell, and positioning the inner shell within the outer shell.

The invention also relates to a novel thermal insulating member for a double walled cabinet such as a refrigeration cabinet comprising at least one base component constructed of a resilient thermal insulating material for positioning along the forward marginal portions of the inner walls of the cabinet to form a thermal insulating barrier between the inner walls of the cabinet and the outside atmosphere. This thermal insulating material may be formed as one unitary member or a plurality of members configured and dimensioned for positioning along the forward marginal portion of the inner walls and between the inner and outer walls of the cabinet.

The member defines a plurality of generally elongated continuous grooves therealong for reception of electrical wires or tubing depending upon the need in each case. This thermal insulating member also has means for removable engaged attachment of a correspondingly dimensioned cover means constructed of a similar or identical non-heat conducting material.

The invention also relates to a refrigeration cabinet comprising a plurality of plate members forming inner and outer box like structures and defining respective inner and outer rear, top, bottom, and side walls having a polymerized thermal insulating medium therebetween, the medium being adhered to the plate members and substantially retaining the plate members in their predetermined arrangement as a single unit, the forward marginal portions of the inner top, bottom, and side plate members having extending therealong at least one thermal insulating member formed of a non-heat conducting material to form a thermal insulating barrier between the inner walls of the cabinet and the outside atmosphere, the thermal insulating member being configured and dimensioned to extend across the forward portion between the inner and outer walls to at least contain the polymerized thermal insulating material therebetween during polymerization. This thermal insulating member also defines a plurality of generally elongated continuous grooves therealong for reception of electrical wires connected to the electrical system of the cabinet, and has means for removable engaged attachment of a correspondingly dimensioned cover means constructed of a similar or identical resilient non-heat conducting material.

Preferably, the means for removable engaged attachment of the cover means comprises at least two grooves defined by the thermal insulating member. These grooves are dimensioned, configured and positioned to removably and engagably receive at least two resilient correspondingly dimensioned and positioned extensions connected to the cover means.

An alternate embodiment of the present refrigeration cabinet includes a plurality of plate members forming inner and outer box like structures and defining respective inner and outer rear, top, bottom, and side walls having a polymerized thermal insulating foam therebetween, the foam being adhered to the plate members and substantially retaining the plate members in their predetermined arrangement as an integral unit, the forward inner marginal portions of the inner top, bottom, and side plate members having extending therealong a thermal insulating member comprising a base member formed of a thermal insulating material positioned along the outer marginal portions of the inner walls of the refrigeration cabinet to form a thermal barrier between the inner walls of the cabinet and the outside atmosphere. This thermal insulating member is positioned, configured, and dimensioned to extend across the forward portion between the inner and outer walls, and defines a plurality of generally elongated continuous grooves therealong. At least one of the grooves is capable of receiving electrical wires connected to the electrical system of the refrigeration cabinet.

The thermal insulating member also includes cover means correspondingly dimensioned to be positioned over the base member and has means for removable engaged attachment to the base member. Such attachment means are in the form of resilient extensions correspondingly positioned, configured, and dimensioned for removable engaged reception by portions of the base member defining the grooves.

In this embodiment, the base member preferably defines at least two elongated grooves positioned, configured, and dimensioned to removably engagably receive at least two correspondingly positioned, configured and dimensioned resilient extensions connected to the cover means to provide selective removal of the cover means thereby facilitating access to the electrical wires in the grooves defined by the base member without the need to remove components forming part of the cabinet.

The invention also contemplates the fabrication of novel cabinets which includes the thermal insulating member previously described, either in the form of several strips, or in a single unitary form.

The invention also relates to an apparatus for fabricating refrigeration cabinets of the type including an outer shell and an inner shell separated by a thermal insulating medium, which comprises means for receiving, supporting, and maintaining a plurality of components in a predetermined arrangement forming the outer shell, means for supporting and maintaining a plurality of components in a predetermined arrangement forming the inner shell, means for positioning inner shell supporting means within the outer shell supporting means so as to define a space between the inner and outer shells for reception of polymerizable thermal insulating medium forming components while the inner shell is positioned within the outer shell, and, means for introducing the polymerizable thermal insulating medium forming components into the space defined between the inner and outer shells so as to define a thermal insulating barrier between the inner and outer shells, so as to simultaneously retain the respective inner and outer shell components in their predetermined relative arrangements.

The outer shell support means comprises an outer shell support fixture having a plurality of supporting members capable of being arranged to support the outer shell components in the predetermined arrangement in a vertical or upright position. Also, the apparatus can further comprise means to maintain and hold the outer shell components in the predetermined arrangement.

Preferably, the means to maintain the outer shell components is at least one suction cup located in each support member of the outer shell support fixture, wherein the suction cups are connected to a vacuum source.

The inner shell support means comprises an inner shell support fixture having a plurality of support members capable of being arranged to support the inner shell components in the predetermined arrangement initially in a horizontal position. Also, the apparatus further comprises means to maintain the inner shell components in their predetermined arrangement during movement of the inner shell support fixture.

Similar to the outer shell support fixture, the means to maintain the inner shell components is at least one suction cup located in each support member of the inner shell support fixture, wherein the suction cups are connected to a vacuum source.

Also, the means for positioning the inner shell support fixture comprises means for movement of the inner shell support fixture towards the outer shell support fixture, means for rotation of the inner shell support fixture, and means for alignment and insertion of the inner shell support fixture into and out of the outer shell support fixture.

The means for movement of the inner shell support fixture is preferably a support carriage supported by rollers, wheels, or rails wheels. Also, the means for rotation of the inner shell support fixture is a piston and cylinder actuating system mounted on the support carriage. The inner shell support fixture is pivotally secured to the support carriage to facilitate pivotal rotation from a horizontal position for formation of the inner shell to a vertical position in alignment with the outer shell support fixture. Also the means for alignment and insertion of the inner shell support fixture is at least one rail or track positioned to facilitate the alignment and insertion, upon which the carriage may move.

BRIEF DESCRIPTION OF THE DRAWINGS

Preferred embodiments of the invention are described hereinbelow with reference to the drawings wherein:

FIG. 2 is a top plan view of the assembled inner shell components on the table of FIG. 1;

FIG. 3 is an enlarged, fragmented view taken substantially along lines 3—3 of FIG. 2 illustrating the lower corner of the inner shell;

FIG. 4 is a cross-sectional view of the lower corner of the inner shell of FIG. 3, taken along lines 4—4 of FIG. 3;

FIG. 11 is a side cross-sectional view of the apparatus of FIG. 9 during molding, but taken along the direction illustrated by line 11—11 of FIG. 9;

FIG. 12 is an enlarged view of the side of the outer shell forming mold illustrating the foam introduction feature;

FIG. 13 is a cross-sectional view of the foam introduction feature taken along lines 13—13 of FIG. 12;

FIG. 13A is a top plan view of the foam introduction gun of FIG. 13 illustrating the direction of introduction of the foam;

FIG. 14 is a view of a refrigerator cabinet constructed according to the method of the invention on the apparatus of the invention;

FIG. 15 is a cross-sectional view taken along line 15—15 of FIG. 14 illustrating the refrigeratorfreezer dividing wall and the corresponding thermal breaker strip of the invention;

FIG. 16 is a cross-sectional view taken along line 16—16 of FIG. 14 illustrating the thermal insulating member for the inner shell-out shell connection;

DESCRIPTION OF THE PREFERRED EMBODIMENTS

In the description which follows, rearward, forward, bottom and top refers to a refrigeration cabinet when standing in its normal upright position.

Although the invention relates to novel systems, methods, and apparatus for fabricating many types of cabinets, the preferred embodiments are directed to refrigerator cabinets where the medium between the inner and outer shells is a thermal insulating foam which adheres to the plates to retain them in their predetermined arrangement. It should be understood, however, that all types of cabinets can be fabricated within the scope of the invention by introducing an adhering medium between the inner and outer plates of the respective inner and outer shells in accordance with the invention to thereby retain them in their predetermined arrangement.

Figure 1:
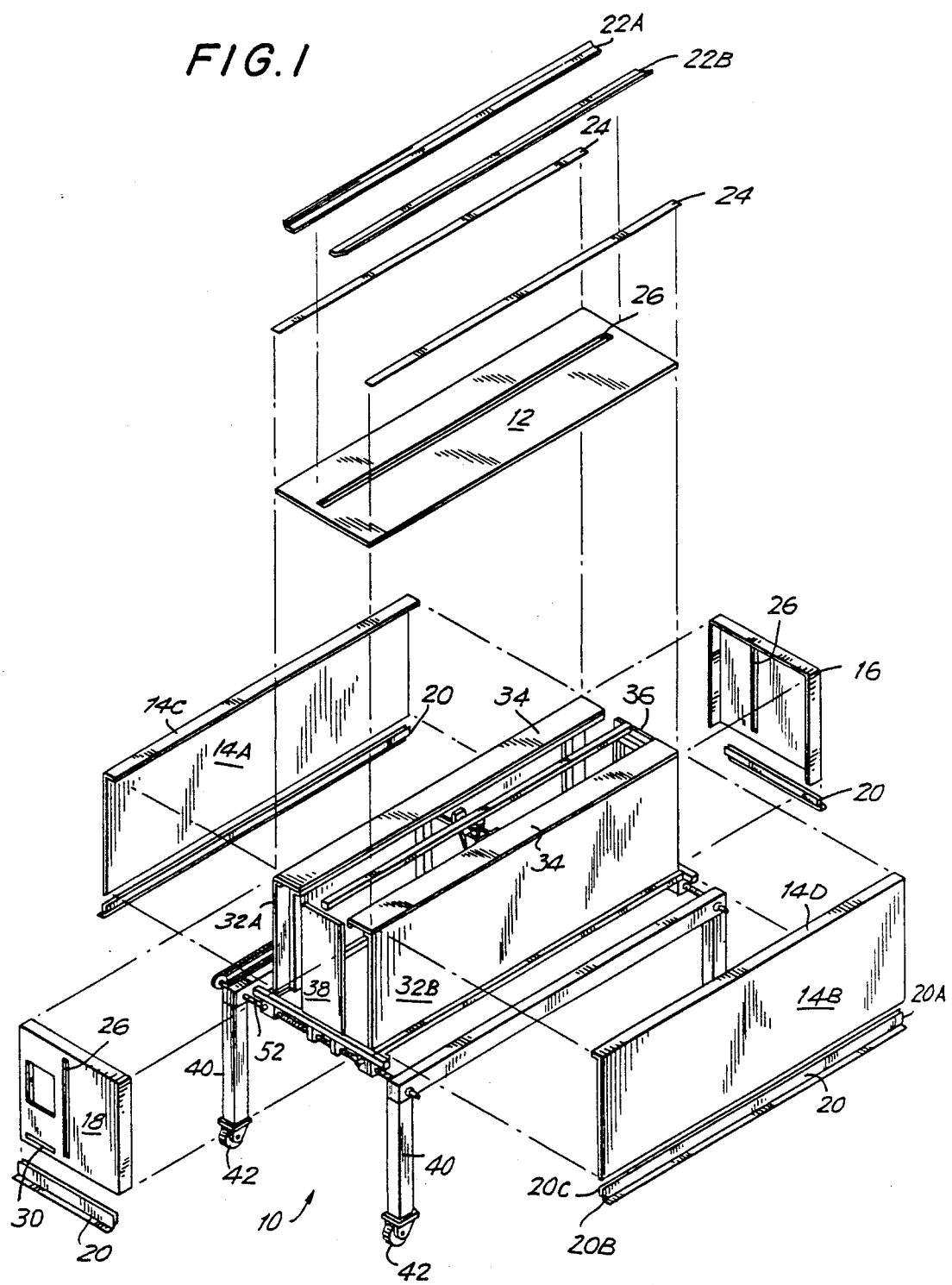
FIG. 1 is a perspective view of the inner shell forming table and inner shell components separated to illustrate their relative positions on final assembly.

Referring initially to FIG. 1, there is illustrated an inner shell forming table 10 which is used to construct the inner shell of the refrigeration cabinet according to the invention. This table provides both support for the inner shell components as well as control over the inner dimension and spacing of these components. These inner shell components are shown separated to illustrate their relative positions on final assembly. The preferred fabrication sequence is as follows.

The inner shell rear panel 12 is placed on the top of the forming table which has been adjusted to define the inner dimensions of the refrigeration cabinet to be assembled. Thereafter, two side panels 14A and 14B are positioned against the sides of the forming table with the bent marginal ends of the side panels 14C and 14D respectively, overlapping the rear panel 12. Next, bottom panel 16 and top panel 18 are installed in position such that their bent marginal ends overlap both the rear and side panels. These panels are preferably in a prefinished condition (i.e. painted, polished, etc.).

Thermal insulating members 20 constructed of a substantially non-heat conducting material such as plastic, and which are cut to the proper size to match the lengths of side panels 14A and 14B, bottom panel 16, and top panel 18, are then attached to those panels by inserting the forward marginal ends of the panels into the space 20A defined by two extension legs 20B and 20C located at the rearward marginal end of the thermal insulating member. Alternately the insulating members 20 may be in the form of a single continuous member dimensioned to be positioned along the forward marginal portions of the inner shell plates. Reinforcing bars 22A and 22B are then placed along the rear panel 12 to later facilitate attachment of the interior shelf supports of the refrigeration cabinet.

Each of these components is then temporarily held in position with the aid of masking (or other) tape 24. In FIG. 1, masking tape 24 is only shown for holding the bent marginal ends of the 14C and 14D side panels to the rear panel 12. However, it is applied liberally to hold each component in an assembled relation.

The refrigerator cabinet which is being assembled in FIG. 1, contemplates a side by side freezer/refrigerator unit. Therefore, the wall members in contact with the freezer section must be thermally insulated from the wall members in contact with the refrigerator section. This is accomplished by providing notch 26 in the rear, bottom and top panels to prevent thermal conductivity through the metal. Alternately, instead of using the notch 26 in a single inner shell, the inner shell may be in two separate halves. Also, top panel 18 is provided with a cutout area 28 for the flow of refrigerated air from the refrigerating compartment into the freezer and refrigerator sections of the cabinet as well as a return opening 30 for the return of the spent refrigerated air.

The forming table 10 is comprised of support members 32A, 32B, 34, 36 and 38 which support the side panels 14A and 14B, rear panel 12, bottom panel 16 and top panel 18, respectively. In a preferred embodiment, the dimensions of the height and depth of the inner shell of the refrigerator cabinet are maintained constant, while the width of the inner shell can be varied as will be described hereinbelow. The forming table 10 is also provided with legs 40 and rollers 42. The legs 40 increase the height of the table to facilitate the ease of assembly of the inner shell components, while the rollers 42 allow the table to be easily movable around the manufacturing location.

FIG. 2 illustrates the assembled inner shell 44 on forming table 10. This view also illustrates the overlap of the side members 14A and 14B on the rear panel 12 as well as the bottom panel 16 and top panel 18 and their overlap on the side and rear panels.

Referring now to FIG. 3, there is illustrated a fragmentary side view of the lower corner of the assembled inner shell to show the detail of the thermal insulating member connection to the side wall. The rearward marginal ends 20B and 20C of the thermal insulating member 20 are separated by a space 20A which receives the forward marginal end of the steel wall panel member.

FIG. 4 further illustrates this feature and it shows the steel side panel 14B and top 18 sandwiched between ends 20B and 20C and into space 20A of thermal insulating member 20 along with the overlapping width of the thermal insulating member.

Figure 5:
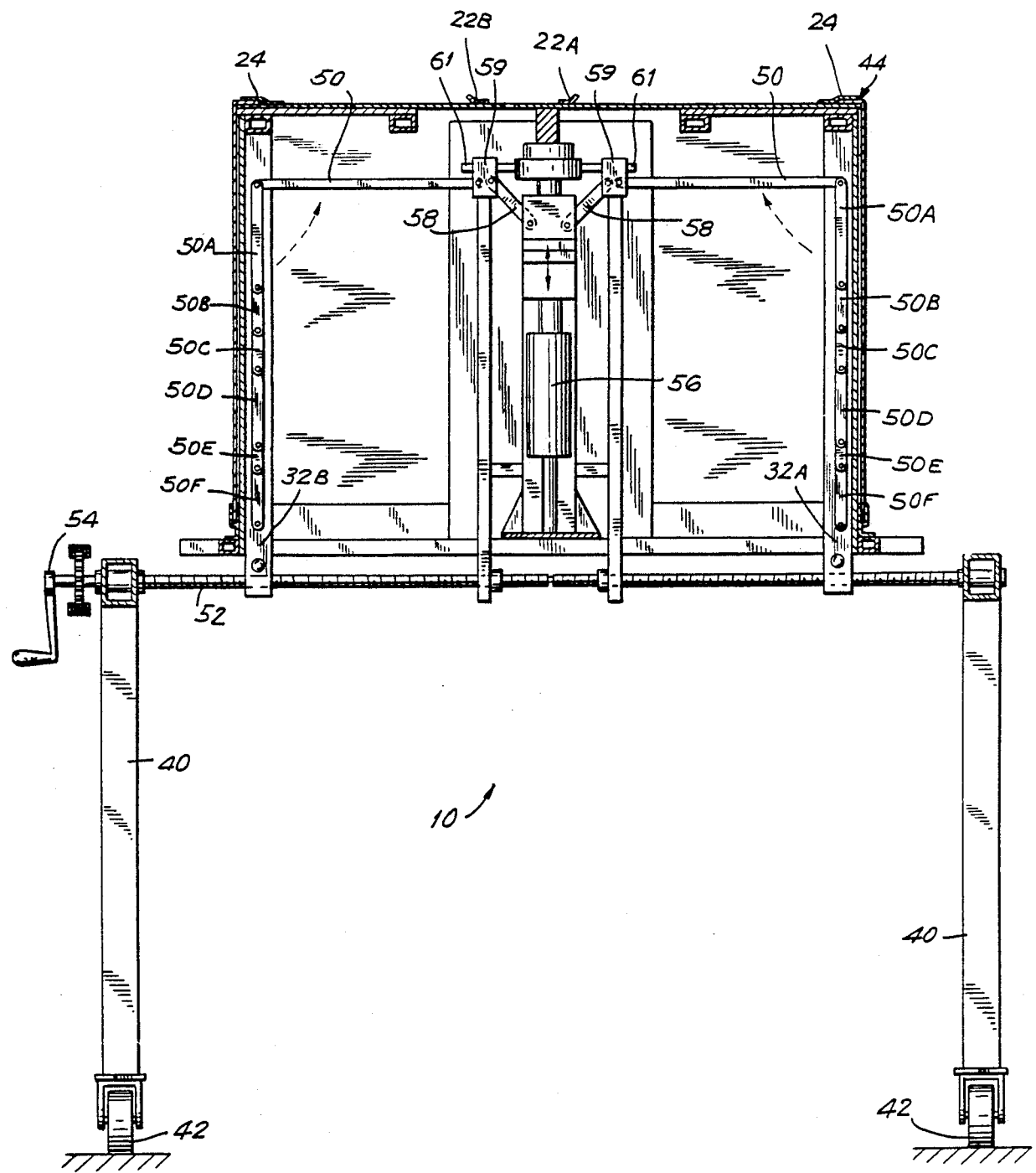
FIG. 5 is a cross-sectional view of the inner shell forming table taken along lines 5—5 of FIG. 2.

Referring now to FIG. 5, the interior adjusting mechanisms of the forming table 10 are now illustrated. In a preferred embodiment of the invention, it is contemplated that the height and depth of the inner shell of the refrigerator cabinet are standardized to one dimension. The forming table can be adjusted, however, to accommodate inner shells of various widths. This is accomplished through the use of one of a number of spacer bars 50. When the smaller spacer bars 50A are connected to the adjusting mechanism, the width of the forming table is maintained at the smaller width dimension. Correspondingly, to increase the width of the table and subsequent inner dimension of the refrigerator cabinet, a longer spacer bar 50B, 50C, 50D, 50E, 50F can then be selected. The outer sides of the table are then moved along threaded rod 52 by a crank 54 until the spacer bar is fully extended. This procedure accurately determines the outer dimension of the table uniformly upon repeated width changes.

Also shown is a central column 56 to which the spacer bars 50 are attached. After the inner shell is assembled, this central column 56 is moved downward, thus drawing in forming table sides 32A and 32B due to the corresponding downward movement of arms 58 which allows slides 59 to move inwardly along slide bars 61. The inward movement of sides 32A and 32B facilitate the removal of the completed inner shell 44.

Figure 6:
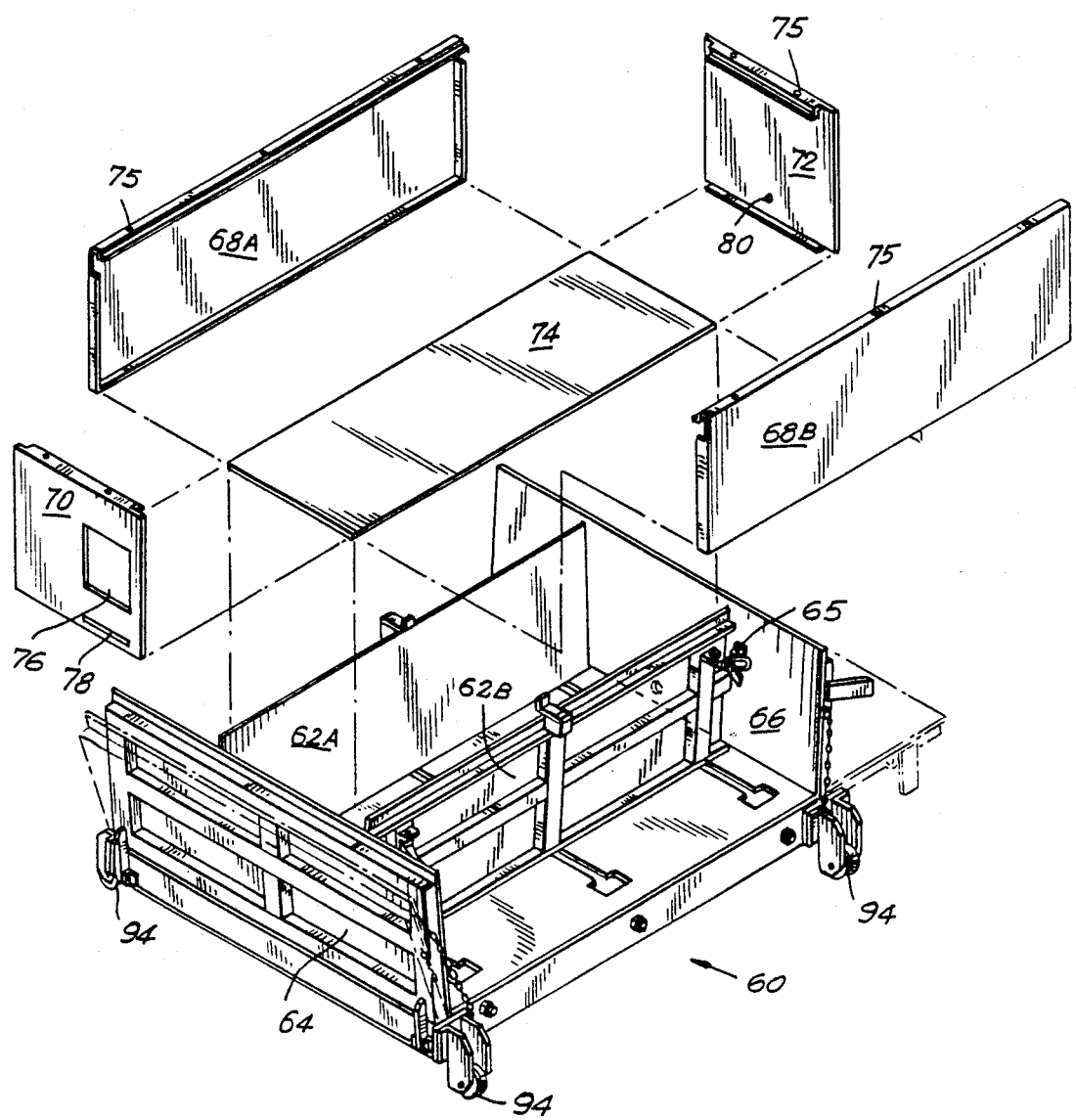
FIG. 6 is a perspective view of the outer shell forming mold and outer shell components separated to illustrate their relative positions on final assembly.

Referring now to FIG. 6 there is illustrated an outer shell forming mold 60 which is used to construct the outer shell. This mold provides both support for the outer shell components as well as control over the outer dimensions of the outer shell. The shell components themselves are separated to illustrate their relative positions on final assembly. The fabrication sequence of the outer shell is as follows. The side support members of the mold 62A and 62B are adjusted to define the outer side dimensions of the refrigerator cabinet to be assembled. Then, the top and bottom support members, 64 and 66, respectively, which can be rotated to a horizontal position to allow for removal of the completed cabinet are brought to an upright position and secured to the side members by the use of clamping mechanism 65 thus forming the rectangular mold defining the outer dimensions of the outer shell. Next, the two side panels 68A and 68B of the outer refrigerator cabinet are placed along the sides of the cavity defined by the mold. Subsequently, top panel 70 and bottom panel 72 are also placed in the mold in contact with side panels 68A and 68B. Finally, bottom panel 74 is placed into the bottom of the mold in contact with the four other panels. Note that the top, bottom and side panels have flaps or extensions which overlap onto the back of panel 74. These panels may also optionally be prepainted or polished. Vent holes 75 are provided as shown to permit release of air during the foam expansion process. These holes also provide a visual indication of a fully foamed condition when foam appears through the vent holes 75.

Since the support members of the outer shell forming mold are heavy plates (aluminum, steel, etc.) which are reinforced with heavy beams, (aluminum, steel, etc.) the mold will not move once subjected to pressure from forces such as those generated by expanding polyurethane foam. Thus, the outer dimensions of the outer shell will be maintained as the inner dimensions of the mold cavity.

It should also be noted that for the particular type of refrigerator contemplated, top panel 70 has cutout area 76 which corresponds to cutout area 28 of the top panel 18 of the inner box for the flow of refrigerated air from the refrigerating compartment into the freezer and refrigerator section of the cabinet Also, top panel 70 has a return opening 78 which corresponds to return opening 30 of top panel 18 of the inner cabinet for the return of spent refrigerated air. Also, bottom panel 72 has a cutout aperture 80 to provide for insertion of the foam dispensing gun and the introduction of the thermal insulating foam forming components.

Figure 7:
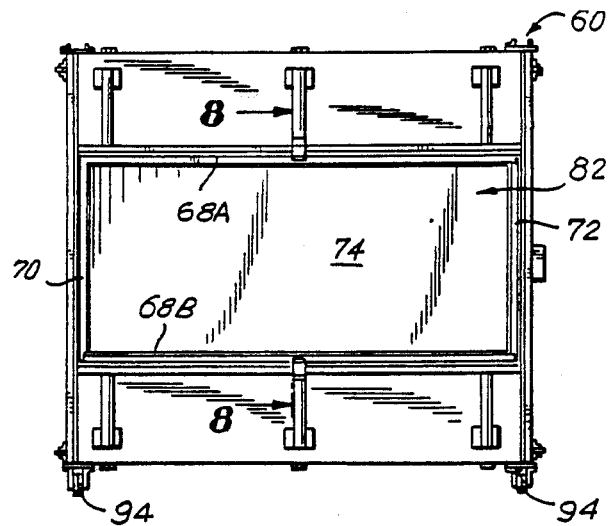
FIG. 7 is a top plan view of an assembled outer shell in the forming mold of FIG. 6.

FIG. 7 illustrates an assembled outer shell 82 in the forming mold 60. Unlike the inner box assembly, the assembly of the outer box does not require masking tape to hold the parts in relative positions.

Figure 8:
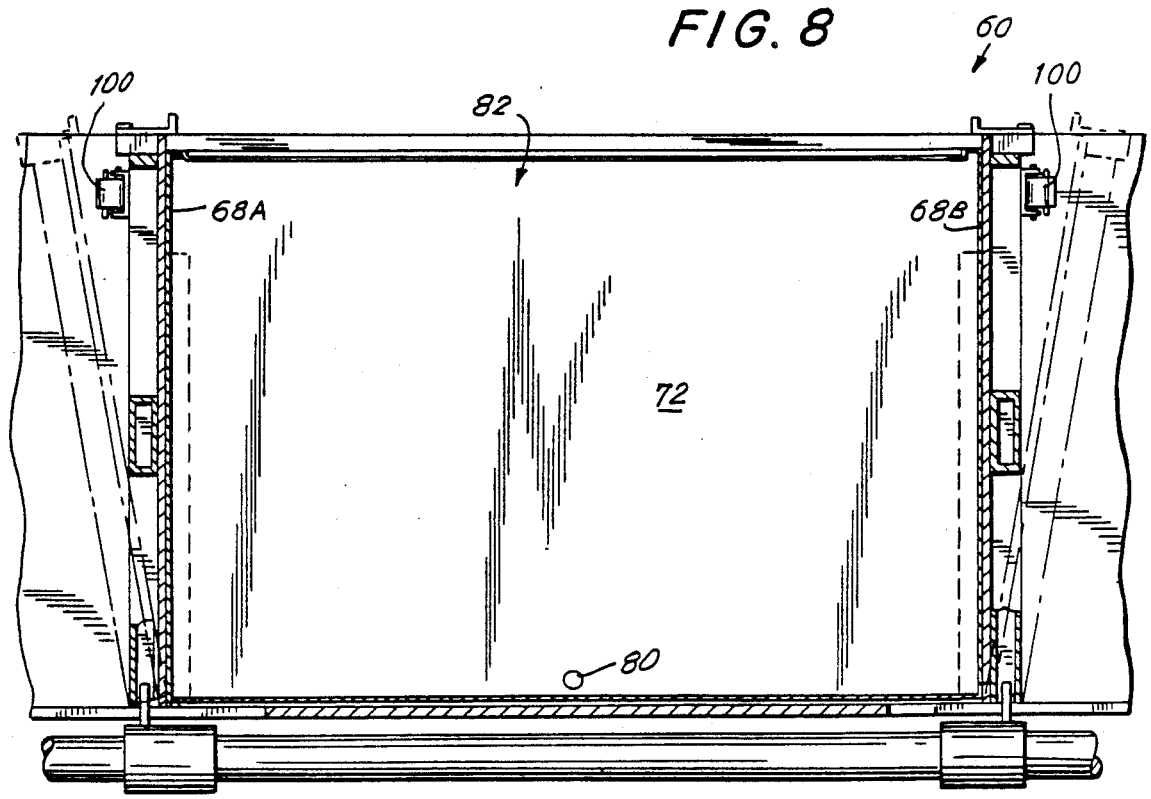
FIG. 8 is a cross-sectional view taken along lines 8—8 of FIG. 7.

Referring now to FIG. 8, there is illustrated a cross sectional view of the assembled outer shell 82 in position in the forming mold 60.

Although not shown in the drawings, the next step in the manufacturing sequence is to remove the inner shell from the forming table and then to place it within the outer shell in the outer shell forming mold.

Figure 9:
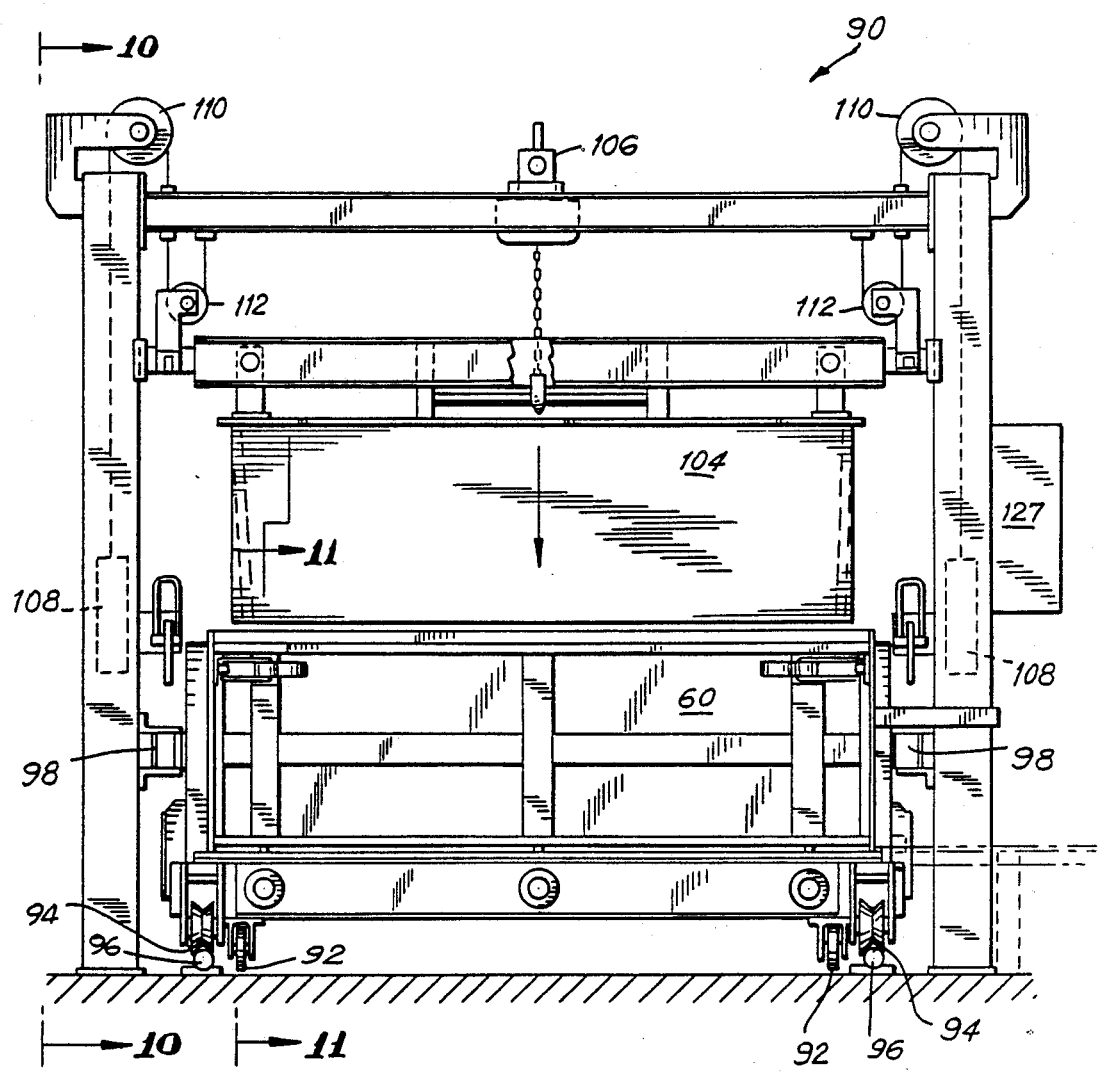
FIG. 9 is a front view of the outer shell forming mold containing the assembled outer and inner shell components positioned for reception of the inner shell mold.

Referring now to FIG. 9, there is illustrated the outer shell forming mold contaiing both the outer and inner shells, in position in the molding station 90. The outer shell forming mold 60 is easily moved through the shop upon its rollers 92. Four additional rail wheels 94 are provided, one under each corner of the outer shell mold. After completing the assembly of the inner and outer shells, the outer shell forming mold 60 is then positioned within the molding station 90. Positioning is accomplished by aligning the four rail wheels 94 upon the rails 96 leading to the molding station 90. The rollers 92 of the outer shell forming mold 60 are positioned such that the rear wheels 94 are in contact upon the rails 96, while the rollers 92 do not contact the ground. Additional aligning devices are provided on the frame 98 and on the outer shell forming mold itself 100. The position of the outer shell forming mold is determined by stops 102 at the end of the rails 96. The unit is moved forward on the rails until it contacts the stops which in conjunction with the rails aligns the outer box forming mold properly within the molding station 90.

After properly positioning the outer box forming mold, an inner shell mold 104 which is adjusted to form exactly to the inner dimensions of the inner shell is inserted into the outer shell forming mold. This mold 104 provides support for the inner shell in the same manner as the outer shell forming mold provides for the outer shell. This inner mold is lowered by a crane 106 and pulleys 110, 112, and is balanced by counterweights 108.

Figure 10:
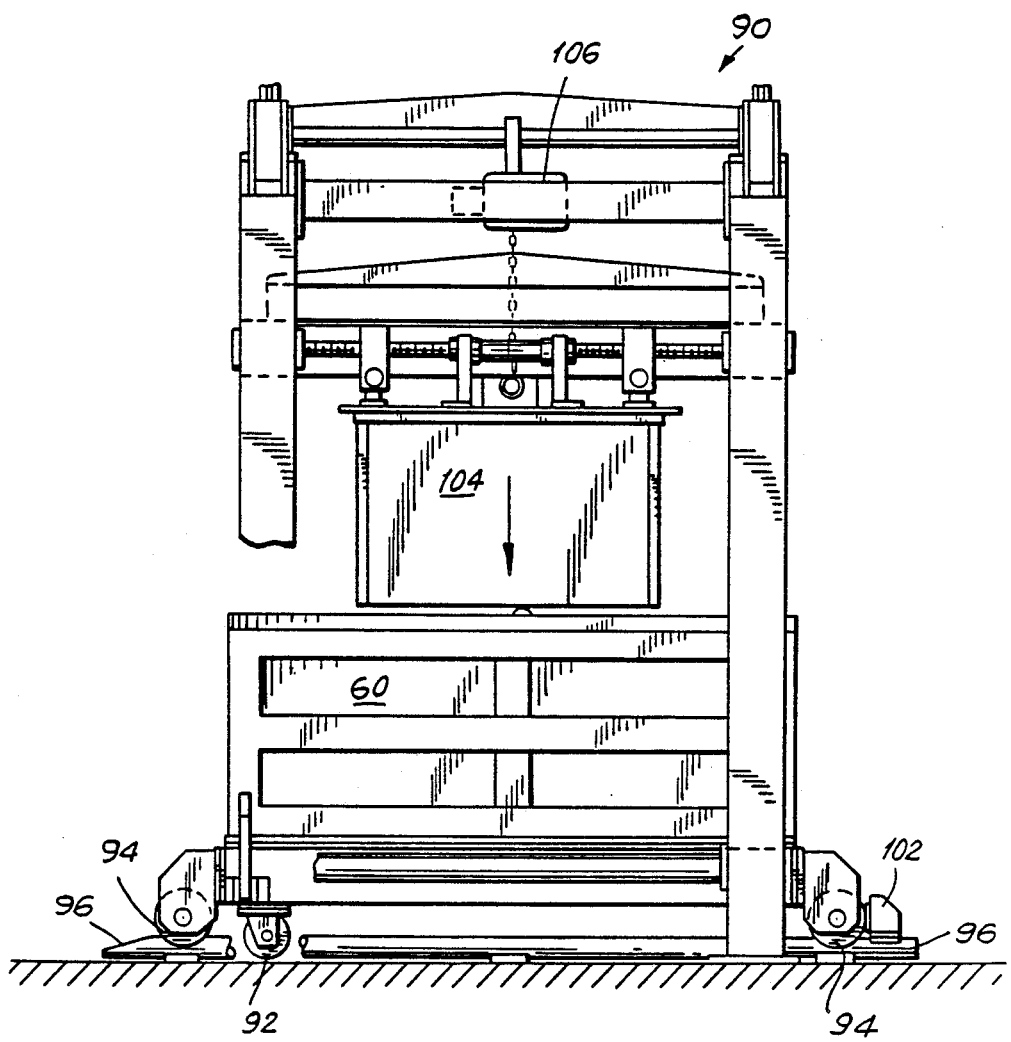
FIG. 10 is a side view of the apparatus of FIG. 9 taken along line 10—10 of FIG. 9.

FIG. 10 is a side view of the outer shell forming mold in position in the molding station.

Referring now to FIG. 11, there is illustrated a cross sectional view of the inner mold 104 in position within the outer shell forming mold 60 after the foam 106 has been introduced between the outer and inner shells.

FIG. 12 illustrates the details of the foam injection system. Foam gun nozzle 110 is inserted through opening 112 in the outer shell forming mold. This opening extends through support member 66 of the forming mold and also through junction box 122 as shown. Opening 112 also aligns with opening 80 of outer shell bottom panel 72. The nozzle 110 of the foam gun has a cap 118 preferably made of a suitable plastic material such as teflon. Two apertures 120 provided in nozzle 110 are oriented at 45° angles to the direction of the nozzle 110 to promote dispersion of the foam forming components. However, any selection of angular orientations may be used, depending upon the relative size of the area to be filled.

During operation, the foam gun nozzle 110 is inserted about 3 feet into the space between the shells and foam forming components are introduced. The introduction of these components is controlled by a computer control 127 mounted on the molding station frame. Since the components which form the foam are in a liquid state when introduced, but later solidify to a somewhat rigid foam material, the foam gun nozzle is partially retracted immediately after introducing the foam forming component and aligns to prevent leakage of the foam through the introduction hole 80 in outer shell plate 72. The novel design of the foam gun nozzle 110 allows the teflon cap 118 to retract into the inner teflon sleeve 121 to substantially prevent leakage of the foam forming components, while also allowing nozzle holes 120 to align with the junction box drain 124 in junction box 122. This allows for the removal of excess foam forming components 126 from the nozzle by introduction of a solvent through the nozzle 110 before the foam forming components react, expand, and cure, thus allowing the nozzle holes to remain open and unplugged for subsequent addition of foam forming components to future assemblies. Outer teflon sleeve 123 is also provided to prevent leakage from out of the junction box 122.

It should be noted that the molding station should be located in an area or room which is maintained at a temperature which facilitates optimum flow of the adhering medium and subsequent optimized polymerization or curing. For polyurethane foam, it is preferable to maintain this temperature at about 90° F. Alternatively, heating elements (not shown) may be provided on the outer sides of the outer forming mold support plate members to promote flow and curing of the adhering medium.

Referring once again to FIG. 11, the nozzle extends between the outer and inner box members as far as necessary to distribute the foam throughout the lower section of the space between the shells. This extension is shown in phantom at 128. As the foam is introduced into the space between the inner and outer shells, it begins to polymerize and to expand. As the foam expands, it fills the entire open area between the two boxes. Also, the dimensions of the inner and ouer shells are maintained by the inner shell mold and outer shell forming mold respectively. These molds exert sufficient force to resist movement of the inner and outer shell components from the force of the expanding foam.

FIG. 14 illustrates the completed refrigerator cabinet 132 with the addition of the freezer/refrigerator wall 130 and the refrigeration unit 131 shown in phantom. On the top wall of the cabinet, the holes 28, 30 and 76, 78 which are provided in the plates 18 and 70 respectively, allow for easy cutout and removal of the polymerized foam which fills the space in those areas between the shells. Also, interior wall 130 is provided with a hole 134 which allows the spent refrigerated air to return from the refrigeration section to the freezer and then to the refrigerating unit located on top of the refrigerating cabinet in accordance with the principles of a circulating air refrigeration unit. The refrigeration principles contemplated herein are described in my U.S. Patents Nos. 3,421,338, 3,486,347 and 4,304,101. However, it should be understood that all types of refrigeration cabinets can be fabricated according to the present invention, nothwithstanding the precise refrigeration principles which may be utilized to cool the inside of the cabinet.

Referring now to FIG. 15 there is illustrated the details of the interior wall 130 attachment to the refrigerator cabinet. Channel 140 is then attached to the back inner wall of the completed refrigerator cabinet through the use of screws or rivets 142. The center wall 130 is then inserted into channel 140. This center wall is made in a separate mold from two sheets of steel with the foam placed therebetween. The center wall also has a separate thermal insulating member 144 at its forward end which includes a plurality of grooves 146 for the reception of wires 150, 154 for heating, lighting, etc. During the installation of the wiring for the refrigerator after the wires 150 are in position, the thermal insulating member is covered with finishing channel 148 which is attached to the grooved strip by screws 149 or by mating tongue and groove action (not shown).

An advantage of the present invention is that the refrigeration cabinet (i.e. outer and inner shell) can be fabricated before deciding whether to finally manufacture the refrigeration unit as a side by side or top and bottom freezer/refrigerator (or all freezer or all refrigerator, as desired) since the grooves of the thermal insulating members allow for adaption of wiring, plumbing, etc. in any desired position. In the prior art, this decision must be made before completing the construction of the cabinet because the wires were held in place by the foam. However, if such decision is to be delayed, appropriate modifications of the shell plates should be incorporated. For example, vertical notch 26 in the rear wall of outer shell plate 12 should be accompanied by a horizontal notch, or notches as necessary, along the divider line (not shown).

Referring now to FIG. 16, there is illustrated the details of the thermal insulating member 152 used on the side walls of the refrigerator. Similar to the thermal insulating member for the center divider, the thermal insulating member for the side walls has a plurality of grooves 156 for the installation of similar wiring 154 or plumbing. This member also preferably has a separate removable cover 158 which snaps into position by mating tongue and groove action to facilitate access to the wiring, plumbing, etc. of the refrigerator in the event of a malfunction which must be repaired; however, cover means integral with the insulating member 152 may be provided.

The unique application of the insulating member 144 eliminates the need to predetermine the final arrangement of the freezer/refrigerator (i.e. side by side, top and bottom, etc.), and thereby permits a multiplicity of possible uses of a single cabinet. With the present insulating member 152, it is now possible to fabricate the cabinet incorporating the insulating member and to thereafter install wiring, plumbing, etc., after fabrication of the cabinet so as to permit many possible cabinet configurations. Also this permits future repair or change of wiring or plumbing heretofore not possible by the prior art. This advantageously permits greater production runs on a continuous basis since the decision as to configuration is thereby delayed until after the cabinet is completed.

Optionally various types of cover means can be provided for decorative or protective reasons. Such cover means should permit ready access to the wiring or plumbing for repair or conversion of the cabinet at any future data after completion.

Thermal insulating member 144 now makes it possible to fabricate a furnished cabinet while providing channels for electrical wires (i.e. heater strips such as mullion strips, lighting or the like), while permitting the foaming operation to take place by retaining the foam forming components within the space between the shells. Thus numerous forming components manufacturing steps have been combined into a single operation.

Figure 17:
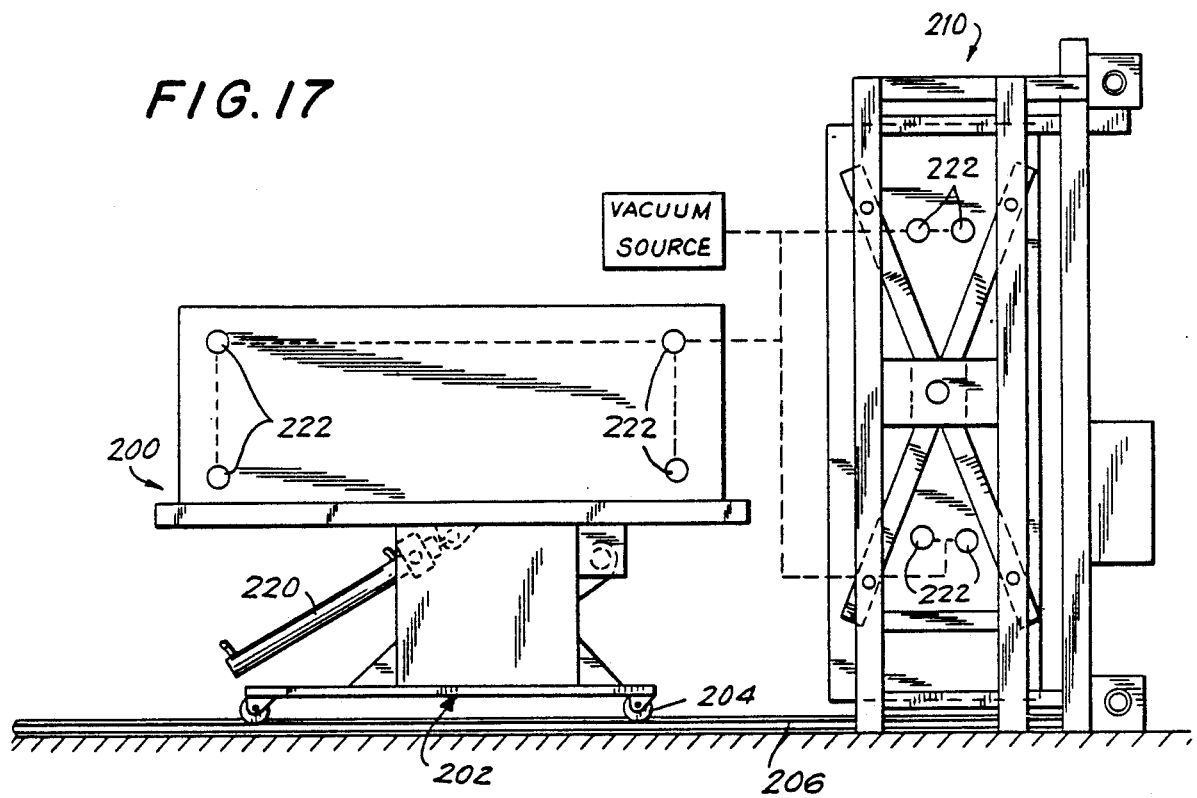
FIG. 17 is a side view of an alternate embodiment of the apparatus of the present invention in position for molding.
Figure 18:
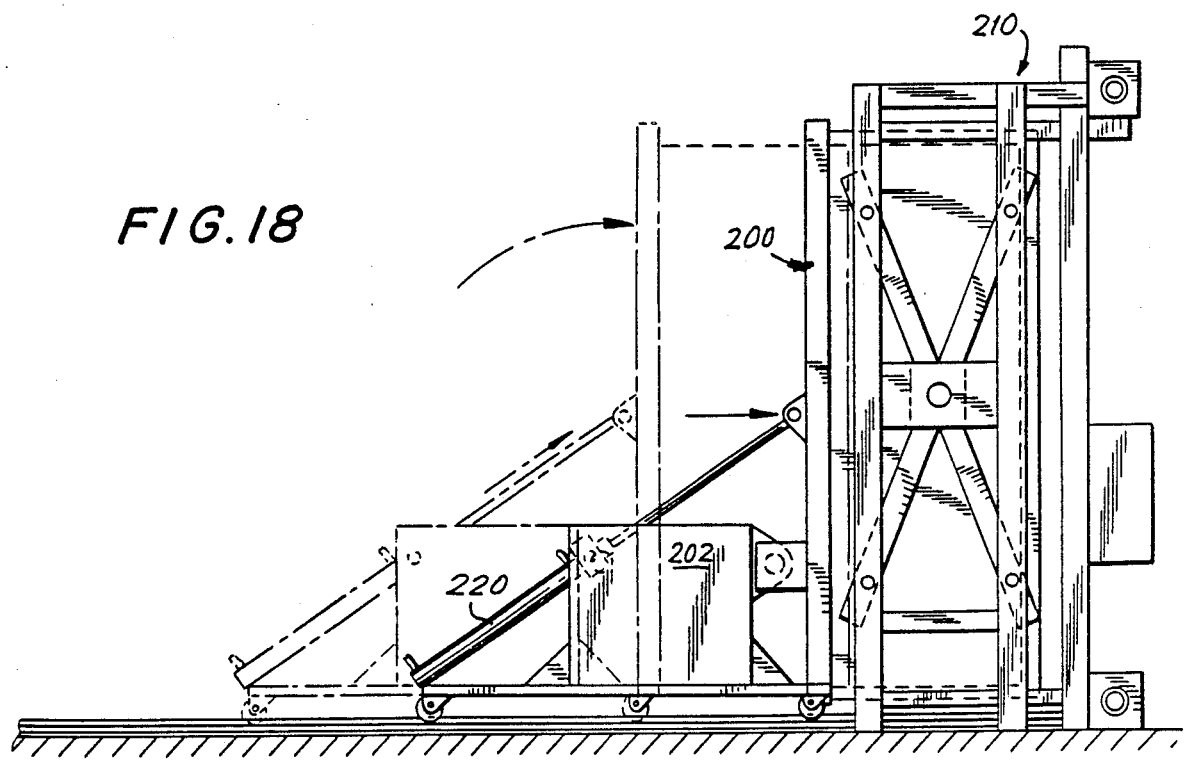
FIG. 18 is a side view of the apparatus of FIG. 17 but in the closed position.

Referring now to FIG. 17, another embodiment is illustrated in which the inner shell of the refrigerator cabinet is formed on a horizontal mold 200 positioned on a carriage 202 which is movable on rail wheels 204 upon rails 206 (one shown). This mold provides both support for the inner shell components as well as control over the final inner dimensions of these components and additional reinforcement against the pressures exerted by the expanding foam. The outer shell of the refrigerator cabinet is formed in a vertical mold 210 in the same manner as in the outer shell forming mold of the previous embodiment. Since certain plate members forming the outer and inner shells are in a vertical position, the plate members are preferably held in their relative arrangement by the use of suction cups 222 preferably communicating with a vacuum source shown schematically in FIG. 17, but actually preferably located in the outer shell forming mold walls. After completion of the assembly of the outer and inner shells, with taped joints as previously described, the horizontal mold is rotated upwardly to the position shown in FIG. 18 and moved into the outer shell mold as shown in that FIG. Such rotation is accomplished by use of hydraulic systems including piston and cylinder devices 220 as shown, and the inner shell mold is moved horizontally into the outer shell mold either manually or automatically as may be desired. The remaining steps of the refrigeration cabinet manufacture is the same as for the preceding embodiments including the foam forming components dispensing apparatus and related computer control system.

In addition, since the molding operation is accomplished in this embodiment with the cabinet in an upright vertical position, it is particularly desirable to include heating elements (not shown) on the outer surfaces of the outer shell forming mold support members in order to provide optimized foam flow to the top of the cabinet. This can be done as an alternative, or in addition to, controlling the temperature of the molding area. Further, the design of the gun nozzle can advantageously be altered to prevent the flow of the foam forming components as well.

In both embodiments described, it is possible to create an assembly line in which outer and inner shells are prepared for molding in advance, to facilitate high volume production. In particular, in the first described embodiment, outer shells can be assembled in advance in a plurality of outer shell forming molds, and inner shells can be assembled in advance on a plurality of inner shell forming tables.

I claim:

1. An apparatus for fabricating cabinets of the type including an outer shell and an inner shell separated by an adhering medium, which comprises:
   (a) means for receiving and supporting a plurality of components in a predetermined arrangement forming said outer shell and a plurality of components in a predetermined arrangement forming said inner shell within said outer shell so as to define a space therebetween for reception of said adhering medium;
   (b) inner shell mold for maintaining said predetermined arrangement of said inner shell components while positioned within said outer shell; and
   (c) means for introducing said adhering medium into the space defined between said inner and outer shells so as to adhere to the respective inner and outer shell components and retain them in their predetermined relative arrangements.

2. An apparatus for fabricating refrigeration cabinets of the type including an outer shell and an inner shell separated by a thermal insulating medium, which comprises: (a) means for receiving and supporting a plurality of components in a predetermined arrangement forming said outer shell and a plurality of components in a predetermined arrangement forming said inner shell within said outer shell so as to define a space therebetween for reception of a thermal insulating medium, said means comprising a support fixture having a base support plate; a plurality of generally upright respectively opposed support plates for contacting support with the components of the outer shell; and means to facilitate pivotal rotation of at least one of said support plates about its lower portion to accommodate reception of the outer shell components and/or removal of the completed cabinet; (b) means for maintaining said predetermined arrangement of said inner shell components while positioned within said outer shell; and (c) means for introducing polymerizable thermal insulating medium forming components into the space defined between said inner and outer shells so as to define a thermal insulating barrier between said inner and outer shells to simultaneously retain the respective inner and outer shell components in their predetermined relative arrangements.

3. The apparatus according to claim 1 wherein said means for supporting a plurality of components in said predetermined arrangement to form the outer shell comprises a support fixture having a plurality of supporting members capable of being arranged to support the outer shell components in said predetermined arrangement.

4. The apparatus according to claim 3 wherein said support fixture comprises a base support plate for contacting support with a component of said outer shell and a plurality of upright respectively opposed support plates for contacting support with other components of said outer shell.

5. The apparatus according to claim 4 further comprising means to vary the dimension between at least two opposed support plates to accommodate outer shell components of different respective dimensions.

6. The apparatus according to claim 5 wherein said means to vary the dimension between at least two opposed support plates comprises means to facilitate movement and means to lock at least one support plate in a predetermined position relative to the position of its opposed support plate.

7. The apparatus according to claim 5 wherein said means to vary the dimension between at least two opposed support plate comprises means to facilitate movement and means to lock at least two support plates in a predetermined spaced relation.

8. The apparatus according to claim 7 further comprising means to facilitate movement and means to lock at least two pairs of said opposed support plates in predetermined relative respective spaced relation.

9. The apparatus according to claim 8 further comprising means for pivotally rotating each of said support plates about its lower portion to accommodate reception of the outer shell components and/or removal of the completed refrigeration cabinet.

10. The apparatus according to claim 9 further comprising means for aligning said inner and outer shell supporting means with said means for maintaining the predetermined arrangement of said inner shell components.

11. The apparatus according to claim 10 wherein said alignment means comprises a plurality of rail wheels supporting said inner and outer shell supporting means on at least two fixed position rails for alignment with said means for maintaining the predetermined arrangement of said inner shell components.

12. The apparatus according to claim 11 further comprising means for suspending said means for maintaining the predetermined arrangement of said inner shell components in a manner so as to be movable into and out of said inner and outer shell supporting means.

13. The apparatus according to claim 12 wherein said means for maintaining the predetermined arrangement of said inner shell components is mounted on a frame and supported by said suspending means.

14. The apparatus according to claim 13 wherein said suspending means is a suspension chain movable upwardly and downwardly by motorized means.

15. The apparatus according to claim 14 wherein said means for maintaining the predetermined arrangement of said inner shell components includes a plurality of support plates spaced by dimensions corresponding to the inner dimensions of the finished cabinet.

16. The apparatus according to claim 15 wherein said inner and outer shell supporting means is further supportable on rollers capable of moving and supporting said supporting means on a substantially flat surface.

17. The apparatus according to claim 15 wherein at least one of said support plates comprises means for introducing polymerizable thermal insulating medium forming components into the space defined between said inner and outer shells.

18. The apparatus according to claim 17 wherein said means for introduction of said polymerizable thermal insulating medium forming components is an aperture extending through the lower portion of the bottom outer shell panel of the finished refrigeration cabinet and the corresponding supporting plate of the outer shell mold.

19. The apparatus according to claim 18 wherein said apparatus is dimensioned for reception of a device capable of dispensing said polymerizable thermal insulating medium forming components.

20. The apparatus according to claim 19 wherein said support plates of said means for maintaining the predetermined arrangement of said inner shell components are of sufficient strength to provide relatively uniformly distributed outer forces against the plate members of said inner shell in response to inward forces provided by the polymerization and expansion of said polymerizable thermal insulating medium forming components.

21. The apparatus according to claim 20 wherein said support plates of said means for maintaining the predetermined arrangement of said outer shell components are of a sufficient strength to provide relatively uniform outer forces against the plate members of said outer shell in response to outward forces provided by the polymerization and expansion of said polymerization thermal insulating medium forming components.

22. An apparatus for fabricating cabinets of the type including an outer shell and an inner shell separated by an adhering medium, which comprises:
(a) an outer shell mold for receiving and supporting a plurality of components in a predetermined arrangement to define the outer shell and a plurality of components in a predetermined arrangement to define the inner shell within the outer shell so as to also define a space therebetween for an adhering medium;
(b) an inner shell mold for maintaining said predetermined arrangement of said inner shell components while positioned within said outer shell; and
(c) means for introducing said adhering medium into the space defined between said inner and outer shells so as to adhere to the respective inner and outer shell components and retain them in their predetermined relative arrangements.

23. An apparatus for fabricating refrigeration cabinets of the type including an outer shell and an inner shell separated by a polymerized thermal insulating foam, which comprises:
 (a) an outer shell mold for receiving and supporting a plurality of components in a predetermined arrangement to define the outer shell and a plurality of components in a predetermined arrangement to define the inner shell within the outer shell so as to also define a space therebetween for thermal insulating foam;
 (b) an inner shell mold for maintaining said predetermined arrangement of said inner shell components while positioned within said outer shell, said inner shell mold comprising a separate inner shell forming table for arranging said inner shell components in a predetermined arrangement prior to introduction into said outer shell mold; and
 (c) means for introducing polymerizable thermal insulating medium forming components into the space defined between said inner and outer shells so as to define a thermal insulating foam barrier between said inner and outer shells, and to simultaneously retain the respective inner and outer shell components in their predetermined relative arrangements.

24. The apparatus according to claim 23 wherein said inner shell forming table comprises support members which are threadably mounted onto elongated threaded rods to permit changing the dimension of said forming table to facilitate production of inner shells of various sizes.

25. The apparatus according to claim 24 wherein said inner shell mold is mounted on a frame and movable into and out of said outer shell mold.

26. The apparatus according to claim 25 wherein said frame includes track members to stabilize the upward and downward movement of said inner shell mold.

27. The apparatus according to claim 26 wherein said means for introducing polymerizable thermal insulating foam forming components is an aperture extending through the outer shell mold and a correspondingly located aperture in one of the outer shell components.

28. The apparatus according to claim 27 further comprising an apparatus for introducing said polymerizable thermal insulating foam forming components into the space defined by said inner and outer shells to form a thermal insulating foam therebetween.

29. The apparatus according to claim 28 wherein said apparatus for introducing said polymerizable thermal insulating foam forming components is a foam gun.

30. The apparatus according to claim 29 wherein said foam gun is connected to means for controlling the relative portions of said polymerizable thermal insulating foam forming components introduced into the space between the inner and outer shells to produce the required predetermined amount of thermal insulating foam necessary to at least substantially fill the space between the inner and outer shells.

31. The apparatus according to claim 30 wherein said means for controlling the relative portions of said polymerizable thermal insulating foam forming components is a computer control.

32. The apparatus according to claim 31 wherein said computer control is connected to a supply of said polymerizable thermal insulating foam forming components.

33. The apparatus according to claim 32 wherein said foam gun includes means for retraction and to prevent leakage of the polymerizable thermal insulating foam forming components through said apertures.

34. The apparatus according to claim 33 wherein said foam gun includes means for automatically introducing said foam gun into said apertures.

35. The apparatus according to claim 34 wherein said means for automatically introducing said foam gun into said apertures further comprises means for removing excess polymerizable thermal insulating foam forming components before they polymerize, expand, and plug said means for preventing leakage.

36. An apparatus for fabricating cabinets of the type including an outer shell and an inner shell each formed substantially of a plurality of plate members, said inner shell being separated from said outer shell by an adhering medium, which comprises:
 (a) a first mold fixture for receiving and supporting a plurality of plate members in a predetermined arrangement forming the outer shell, said outer shell having a plate member defining a rear outer wall and four plate members extending substantially perpendicular to said rear outer wall plate member in end to end relation therewith about the periphery thereof to form respectively, a top outer wall, a bottom outer wall and two side outer walls, said outer shell having positioned therein an inner shell formed of a plurality of plate members, said inner shell plate members forming a rear inner wall and four plate members extending substantially perpendicular to said rear inner wall plate member along the periphery thereof, the dimensions of said rear inner wall plate member being less than the corresponding dimensions of said rear outer wall plate member such that the inner shell and the outer shell define a space therebetween for reception of an adhering medium therein, and said first mold fixture including a plurality of upright plate members, at least two of which are movable and lockable to spaced positions corresponding to the respective outer dimensions of said outer shell, said first mold fixture plate members being of sufficient strength to restrain movements of said outer shell plate members in outward directions;
 (b) a second mold fixture movable from positions into and out of said first mold fixture, said second mold fixture having main support means having a plurality of downwardly extending plate members, at least two of which are movable and lockable to relative positions corresponding to the respective dimensions of said inner shell plate members, said second mold fixture plate members being of sufficient strength to restrain uniformly, inward movements of said inner shell plate members;
 (c) at least one gun for dispensing said adhering medium which sets or cures to form an adhesive within the space between the inner and outer shells, the dispensing portion of said gun being positioned for insertion and removal through an aperture defined by at least one of said upright plate members of said first mold fixture and also through an aperture defined by the corresponding plate member of said outer shell substantially in alignment with said first mentioned aperture such that the dispensing portion of said gun is positionable within the space defined between said inner and outer shells; and
 (d) means for supplying said adhering medium and for controlling the amount and rate of said adhering medium to said gun for dispensing into said space defined by said inner and outer shells said medium which forms, upon setting or curing, an adhesive medium to substantially fill the entire space therebetween, said adhesive medium being of the type which adheres to the plate members defining the inner and outer shells, the support members of said first and second mold fixtures being of sufficient strength and having continuous surfaces to maintain the corresponding respective contacting plate members of said inner and outer shells in a correspondingly substantially flat condition against the forces provided therebetween by introduction of said adhering medium during setting or curing, and means extending across the forward portion of said space defined by said inner and outer shells and being positioned to prevent leakage of said adhering medium such that upon final setting or curing, said adhering medium adheres to the respective plate members of said inner and outer shells and retains them in their respective relative positions thereby substantially avoiding the need for other securing and retention means.

37. An apparatus for fabricating refrigeration cabinets of the type including an outer shell and an inner shell each formed substantially of a plurality of plate members, said inner shell being separated from said outer shell by a thermal insulating foam, which comprises:

(a) a first mold fixture for receiving and supporting a plurality of prefinished plate members in a predetermined arrangement forming the outer shell, said outer shell having a plate member defining a rear outer wall and four plate members extending substantially perpendicular to said rear outer wall plate member in end to end relation therewith about the periphery thereof to form respectively, a top outer wall, a bottom outer wall and two side outer walls, said outer shell having positioned therein an inner shell formed of a plurality of prefinished plate members, said inner shell plate members forming a rear inner wall and four plate members extending substantially perpendicular to said rear inner wall plate member along the periphery thereof, the dimensions of the rear inner wall plate member being less than the corresponding dimension of the rear outer wall plate member such that the inner shell and the outer shell define a space therebetween for reception of polymerizable thermal insulating foam forming components therein, said inner shell having extending along the forward peripheral portions, substantially non-heat conducting means to form a thermal barrier between the inner shell and the atmosphere outside said inner shell, said substantially non-heat conducting means including a bridging portion dimensioned, positioned and configured to extend across the space defined between said inner and outer shells at the forward marginal portion thereof, the end of said bridging portion distal from said inner shell being in contact with the forward peripheral portions of said outer shell, and said first mold fixture including a plurality of upright plate members, at least two of which are movable and lockable to spaced positions corresponding to the respective outer dimensions of said outer shell, said first mold fixture plate members being of sufficient strength to restrain movements of said outer shell plate members in outward directions;

(b) a second mold fixture movable from positions into and out of said first mold fixture, said second mold fixture having main support means having a plurality of downwardly extending plate members, at least two of which are movable and lockable to relative positions corresponding to the respective dimensions of said inner shell plate members, said second mold fixture plate members being of sufficient strength to restrain uniformly, inward movements of said inner shell plate members;

(c) at least one foam gun for dispensing polymerizable thermal insulating foam forming components which react to form a polymerized thermal insulating foam within the space between the inner and outer shells, the dispensing portion of said foam gun being positioned for insertion and removal through an aperture defined by at least one of said upright plate members of said first mold fixture and also through an aperture defined by the corresponding plate member of said outer shell substantially in alignment with said first mentioned aperture such that the dispensing portion of said foam gun is positionable within the space defined between said inner and outer shells; and (d) means for supplying said polymerizable thermal insulating foam forming components and for controlling the amounts and rates of said components to said foam gun for dispensing into said space defined by said inner and outer shells said components necessary to form, upon setting, a polymerized thermal insulating foam, to substantially fill the entire space therebetween, said polymerized thermal insulating foam being of the type which expands during polymerization and which adheres to the plate members defining the inner and outer shells, the support members of said first and second mold fixtures being of sufficient strength and having continuous surfaces to maintain the corresponding respective contacting plate members of said inner and outer shells in a correspondingly substantially flat condition against the forces provided therebetween by expansion of said polymerized thermal insulating foam during polymerization, said bridging portion of said substantially non-heat conducting means extending across the forward portion of said space defined by said inner and outer shells and being positioned to prevent outward expansion of said thermal insulating foam during polymerization such that upon final setting, said thermal insulating foam adheres to the respective plate members of said inner and outer shells and retains them in their respective relative positions thereby substantially avoiding the need for other securing and retention means and final finishing step.

38. A system for fabricating cabinets of the type including an outer shell and an inner shell separated by an adhering medium which comprises:

(a) means for supporting a plurality of components in a predetermined arrangement to form said inner shell, said means comprising an inner shell forming table having inner shell top, bottom, rear and side support members and a plurality of spacer bars each connected at one end to one support member and selectively connectable at the other end to a support fixture to establish one dimension for the inner shell;

(b) means for receiving and supporting a plurality of components in a predetermined arrangement to form said outer shell and said inner shell within said outer shell so as to define a space therebetween;

(c) means for maintaining said predetermined arrangement of said inner shell components while positioned within said outer shell; and (d) means for introducing said adhering medium into the space defined between said inner and outer shells so as to adhere to the respective inner and outer shell components and retain them in their predetermined relative arrangements.

39. A system for fabricating refrigeration cabinets of the type including an outer shell and an inner shell separated by a polymerized thermal insulating medium which comprises:

(a) inner shell mold means for supporting a plurality of components in a predetermined arrangement to form said inner shell;

(b) means for receiving and supporting a plurality of components in a predetermined arrangement to form said outer shell and said inner shell within said outer shell so as to define a space therebetween for reception of polymerizable thermal insulating medium forming components;

(c) means for maintaining said predetermined arrangement of said inner shell components while positioned within said outer shell; and (d) means for introducing polymerizable thermal insulating medium forming components into the space defined between said inner and outer shells so as to define a polymerized thermal insulating barrier between said inner and outer shells, and to simultaneously retain the respective inner and outer shell components in their predetermined relative arrangements.

40. The system according to claim 39 wherein said inner shell mold means is a forming table having inner shell top, bottom, rear, and side support members.

41. The system according to claim 40 wherein said support members are adjustably positioned so as to facilitate formation thereon of inner shells of various sizes.

42. The system according to claim 38 wherein at least one of said support members is selectively pivotal inwardly to facilitate removal of the inner shell after formation thereon.

43. The system according to claim 42 wherein said support fixture is movable between two positions and further comprises linking means which correspondingly causes said pivotal movement of at least one support member.

44. The system according to claim 43 wherein said outer and inner shell receiving and supporting means is an outer shell forming mold movable into and out of a molding station and having outer shell top, bottom, rear, and side support members.

45. The system according to claim 44 wherein said support members are adjustably positioned so as to receive and support outer shell components.

46. The system according to claim 45 wherein said support members comprise a bottom wall for supporting the rear outer shell wall and four upright sidewalls for supporting respectively the top, bottom and two sidewalls of the outer shell.

47. The system according to claim 46 wherein said support walls are movable and lockable relative to each other to selectively adjust the spacing therebetween to facilitate formation therein of outer shells of various sizes.

48. The system according to claim 47 wherein at least two of said support walls are pivotally rotatable to accommodate formation of the outer shell and removal of the completed refrigeration cabinet.

49. The system according to claim 48 wherein said means to facilitate movement of said outer shell forming mold into and out of said molding station is a plurality of rail wheels and at least two fixed position rails to facilitate movement to a position in alignment within said molding station.

50. The system according to claim 49 wherein at least one of said side support members of said outer shell mold and its correspondingly supported outer shell component each define an aperture for reception of a correspondingly positioned polymerizable thermal insulating medium forming components introduction gun in alignment therewith when positioned within said molding station.

51. The system according to claim 39 wherein said gun is connected to a supply of said polymerizable thermal insulating medium forming components and is further connected to computer control means capable of predetermining the requisite amounts and properties of said forming components necessary to polymerize, expand, and form a thermal insulating medium which substantially fills the space defined between said inner and outer shells.

52. The system according to claim 51 wherein said means for maintaining said predetermined arrangement of said inner shell components while positioned within said outer shell comprises an inner shell mold mounted on a frame located in said molding station.

53. The system according to claim 52 wherein said inner shell mold is suspended within said frame and is movable upwardly and downwardly along vertical tracks to facilitate alignment with said outer shell forming mold when positioned in said molding station.

54. The system according to claim 53 wherein said inner shell mold frame is suspended within said molding station by a motor driven chain.

55. The system according to claim 54 wherein said molding station includes means for further alignment of said outer shell forming mold and inner shell mold within said outer shell forming mold.

56. An apparatus for fabricating refrigeration cabinets of the type including an outer shell and an inner shell separated by an adhering medium, which comprises:

(a) means for receiving, supporting, and maintaining a plurality of components in a predetermined arrangement forming the outer shell;

(b) means for supporting and maintaining a plurality of components in a predetermined arrangement forming the inner the shell, said means including suction means for maintaining the inner shell components in said predetermined arrangement;

(c) means for positioning said inner shell supporting means within said outer shell supporting means so as to define a space between said inner and outer shells for reception of an adhering medium while said inner shell is positioned within said outer shell; and (d) means for introducing said adhering medium into the space defined between said inner and outer shells so as to adhere to the respective inner and outer shell components and retain them in their predetermined relative arrangements.

57. An apparatus for fabricating refrigeration cabinets of the type included an outer shell and an inner shell separated by an adhering medium, which comprises:

(a) means for receiving, supporting, and maintaining a plurality of components in a predetermined arrangement forming the outer shell, said means including suction means for maintaining the outer shell components in said predetermined arrangement;

(b) means for supporting and maintaining a plurality of components in a predetermined arrangement forming the inner shell;

(c) means for positioning said inner shell supporting means within said outer shell supporting means so as to define a space between said inner and outer shells for reception of polymerizable thermal insulating medium forming components while said inner shell is positioned within said outer shell; and (d) means for introducing said polymerizable thermal insulating medium forming components into the space defined between said inner and outer shells so as to define a thermal insulating barrier between said inner and outer shells and to simultaneously retain the respective inner and outer shell components in their predetermined relative arrangements.

58. The apparatus according to claim 56 wherein said outer shell support means comprises an outer shell support fixture having a plurality of supporting members capable of being arranged to support the outer shell components in said predetermined arrangement in a vertical or upright position.

59. The apparatus according to claim 58 further comprising means to maintain and hold said outer shell components in said predetermined arrangement.

60. The apparatus according to claim 59 wherein said means to maintain said outer shell components is at least one suction cup located in each support member of said outer shell support fixture.

61. The apparatus according to claim 60 wherein said suction cups are connected to a vacuum source.

62. The apparatus according to claim 57 wherein said inner shell support means comprises an inner shell support fixture having a plurality of support members capable of being arranged to support the inner shell components in said predetermined arrangement initially in a horizontal position.

63. The apparatus according to claim 62 further comprising means to maintain said inner shell components in said predetermined arrangement during movement of said inner shell support fixture.

64. The apparatus according to claim 63 wherein said means to maintain said inner shell components is at least one suction cup located in each support member of said inner shell supporting fixture.

65. The apparatus according to claim 64 wherein said suction cups are connected to a vacuum source.

66. The apparatus according to claim 65 wherein said means for positioning said inner shell support fixture comprises means for movement of said inner shell support fixture towards said outer shell support fixture, means for rotation of said inner shell support fixture, and means for alignment and insertion of said inner shell support fixture into and out of said outer shell support fixture.

67. The apparatus according to claim 66 wherein said means for movement of said inner shell support fixture is a support carriage supported by rollers, wheels, or rails wheels.

68. The apparatus according to claim 67 wherein said means for rotation of said inner shell support fixture is a piston and cylinder activating system mounted on said support carriage.

69. The apparatus according to claim 68 wherein said inner shell support fixture is pivotally secured to said support carriage to facilitate pivotal rotation of the inner shell from a horizontal position to a vertical position in alignment with said outer shell support fixture.

70. The apparatus according to claim 69 wherein said means for alignment and insertion of said inner shell support fixture is at least one rail or track positioned to facilitate said alignment and insertion, upon which said carriage may move.

71. An apparatus for fabricating cabinets of the type including an outer shell and an inner shell each formed substantially of a plurality of plate members, said inner shell being separated from said outer shell by an adhering medium which comprises:

(a) a first mold fixture for receiving, supporting, and maintaining a plurality of plate members in a predetermined arrangement in a vertical or upright position forming the outer shell, said outer shell having a plate member defining a rear outer wall and four plate members extending substantially perpendicular to said rear outer wall plate member in end to end relation therewith about the periphery thereof to form respectively, a top outer wall, a bottom outer wall and two side outer walls, said first mold fixture including a plurality of support plate members, at least two of which are movable and lockable to spaced positions corresponding to one outer dimension of said outer shell, said first mold fixture plate members each including at least one suction cup connected to a vacuum source for maintaining said outer shell walls in said predetermined arrangement, said first mold fixture plate members being of sufficient strength to restrain movements of said outer shell plate members in outward directions;

(b) a second mold fixture for supporting and maintaining a plurality of plate members in a predetermined arrangement in an initially horizontal position forming the inner shell, said inner shell plate members forming a rear inner wall and four plate members extending substantially perpendicular to said rear inner wall plate member along the periphery thereof, the dimensions of the rear inner wall plate member being less than the corresponding dimensions of the rear outer wall plate member such that when the inner shell is positioned within the outer shell a space is defined therebetween for reception of an adhering medium therein, said inner shell having extending along the forward peripheral portions, substantially non-heat conducting means to form a thermal insulating barrier between the inner shell and the atmosphere outside said inner shell, said substantially non-heat conducting means including a bridging portion dimensioned and configured to extend across the space defined between said inner and outer shells at the forward marginal portion thereof when said inner shell is positioned within said outer shell, the end of said bridging portion distal from said inner shell being in contact with the forward peripheral portions of said outer shell, said second mold fixture having a main support having a plurality of downwardly extending plate members, at least two of which are movable and lockable to relative positions corresponding to the respective dimensions of said inner shell plate members, said second mold fixture plate members each including at least one suction cup connected to a vacuum source for maintaining said inner shell walls in said predetermined arrangement, and said second mold fixture place members being of sufficient strength to restrain uniformly, inward movements of said inner shell plate members;

(c) a support carriage for supporting and moving said second mold fixture, said carriage being supported by rail wheels, said rail wheels movable along at least one rail toward and away from said first mold fixture, said carriage further comprising piston and cylinder means for rotation of said second mold fixture, said piston and cylinder means being mounted on said carriage and pivotally connected to said second mold fixture while said second mold fixture is rotatably secured to said support carriage thereby facilitating pivotal rotation of said second mold fixture between horizontal and vertical upright positions;

(d) a dispensing apparatus for introducing said adhering medium into the space between the inner and outer shells, the dispensing portion of said dispensing apparatus being positioned for insertion into and removal from an aperture defined by at least one of said upright plate members of said first mold fixture and also through an aperture defined by the corresponding plate member of said outer shell substantially in alignment with said first mentioned aperture such that the dispensing portion of said dispensing apparatus is positionable within the space defined between said inner and outer shells; and (e) means for supplying said adhering medium and for controlling the amount and rate of introduction of said adhering medium to said dispensing apparatus for dispensing same into said space defined by said inner and outer shells to substantially fill the entire space therebetween, said adhering medium being of the type which sets or cures over time after introduction and being further capable of adhering to the plate members defining the inner and outer shells, the support members of said first and second mold fixtures being of sufficient strength and having continuous surfaces to maintain the corresponding respective contacting plate members of said inner and outer shells in a correspondingly substantially flat condition against the forces provided therebetween by the introduction of said adhereing medium, said bridging portion of said substantially non-heat conducting means extending across the forward portion of said space defined by said inner and outer shells and being positioned to prevent leakage of said adhering medium such that upon setting or curing, said adhering medium adheres to the respective plate members of said inner and outer shells and retains them in their respective relative positions thereby substantially avoiding the need for other securing and retention means.

72. An apparatus for fabricating refrigeration cabinets of the type including an outer shell and an inner shell each formed substantially of a plurality of plate members, said inner shell being separated from said outer shell by a thermal insulating foam, which comprises:

(a) a first mold fixture for receiving, supporting, and maintaining a plurality of plate members in a predetermined arrangement in a vertical or upright position forming the outer shell, said outer shell having a plate member defining a rear outer wall and four plate members extending substantially perpendicular to said rear outer wall plate member in end to end relation therewith about the periphery thereof to form respectively, a top outer wall, a bottom outer wall and two side outer walls, said first mold fixture including a plurality of support plate members, at least two of which are movable and lockable to spaced positions corresponding to one outer dimension of said outer shell, said first mold fixture plate members each including at least one suction cup connected to a vacuum source for maintaining said outer shell walls in said predetermined arrangement, said first mold fixture plate members being of sufficient strength to restrain movements of said outer shell plate members in outward directions;

(b) a second mold fixture for supporting and maintaining a plurality of plate members in a predetermined arrangement in an initially horizontal position forming the inner shell, said inner shell plate members forming a rear inner wall and four plate members extending substantially perpendicular to said rear inner wall plate member along the periphery thereof, the dimensions of the rear inner wall plate member being less than the corresponding dimensions of the rear outer wall plate member such that when the inner shell is positioned within the outer shell a space is defined therebetween for reception of polymerizable thermal insulating foam forming components therein, said inner shell having extending along the forward peripheral portions, substantially non-heat conducting means to form a thermal insulating barrier between the inner shell and the atmosphere outside said inner shell, said substantially non-heat conducting means including a bridging portion dimensioned and configured to extend across the space defined between said inner and outer shells at the forward marginal portion thereof when said inner shell is positioned within said outer shell, the end of said bridging portion distal from said inner shell being in contact with the forward peripheral portions of said outer shell, said second mold fixture having a main support having a plurality of downwardly extending plate members, at least two of which are movable and lockable to relative positions corresponding to the respective dimensions of said inner shell plate members, said second mold fixture plate members each including at least one suction cup connected to a vacuum source for maintaining said inner shell walls in said predetermined arrangement, and said second mold fixture place members being of sufficient strength to restrain uniformly, inward movements of said inner shell plate members;

(c) a support carriage for supporting and moving said second mold fixture, said carriage being supported by rail wheels, said rail wheels movable along at least one rail toward and away from said first mold fixture, said carriage further comprising piston and cylinder means for rotation of said second mold fixture, said piston and cylinder means being mounted on said carriage and pivotally connected to said second mold fixture while said second mold fixture is rotatably secured to said support carriage thereby facilitating pivotal rotation of said second mold fixture between horizontal and vertical upright positions;

(d) at least one foam gun for dispensing polymerizable thermal insulating foam forming components which react to form a polymerized thermal insulating foam within the space between the inner and outer shells, the dispensing portion of said foam gun being positioned for insertion into and removal from an aperture defined by at least one of said upright plate members of said first mold fixture and also through an aperture defined by the corresponding plate member of said outer shell substantially in alignment with said first mentioned aperture such that the dispensing portion of said foam gun is positionable within the space defined between said inner and outer shells; and (e) means for supplying said polymerizable thermal insulating foam forming components and for controlling the amounts and rates of said components to said foam gun for dispensing same into said space defined by said inner and outer shells with the components necessary to form, upon setting, a polymerized thermal insulating foam, to substantially fill the entire space therebetween, said polymerized thermal insulating foam being of the type which expands during polymerization and which adheres to the plate members defining the inner and outer shells, the support members of said first and second mold fixtures being of sufficient strength and having continuous surfaces to maintain the corresponding respective contacting plate members of said inner and outer shells in a correspndingly substantially flat condition against the forces provided therebetween by expansion of said polymerized thermal insulating foam during polymerization, said bridging portion of said substantially non-heat conducting means extending across the forward portion of said space defined by said inner and outer shells and being positioned to prevent outward expansion of said thermal insulating foam during polymerization such that upon setting, said thermal insulating foam adheres to the respective plate members of said inner and outer shells and retains them in their respective relative positions thereby substantially avoiding the need for other securing and retention means.

73. An apparatus for fabricating cabinets of the type including an outer shell and an inner shell separated by an adhering medium, which comprises:

means for receiving and supporting a plurality of plate members in a predetermined arrangement forming said outer shell and a plurality of plate members in a predetermined arrangement forming said inner shell within said outer shell so as to define a space therebetween for reception of said adhering medium;

inner shell mold means for maintaining said predetermined arrangement of said inner shell plate members while positioned within said outer shell; and an apparatus for the introduction of a curable or settable adhering medium into the space defined between said inner and outer shells of said cabinet which comprises:

(a) means for dispensing an adhering medium through an aperture located in one of the outer plate members of said outer shell;

(b) means for supplying said dispensing means with the adhering medium; and (c) means for controlling the movement of said dispensing means according to a predetermined sequence, and for monitoring the introduction of said adhering medium according to predetermined amounts necessary to provide, after curing or setting, an adhesive which substantially fills the space between said inner and outer shell plate members and adheres thereto to retain them in a predetermined spaced relation.

74. The apparatus according to claim 73 wherein said dispensing means is an adhesive gun comprising a tube having a cap at its dispensing end and at least two apertures located a predetermined distance from said cap for dispensing said adhering medium.

75. The apparatus according to claim 74 wherein said apertures of said adhesive gun are oriented at a 45 degree angle with respect to the axis of said adhesive gun tube.

76. The apparatus according to claim 75 wherein said means for controlling the movement of said adhesive gun and for monitoring said adhesive medium is a computer control system.

77. The apparatus according to claim 76 wherein said predetermined sequence of said movement of said adhesive gun comprises:

(a) first introducing said adhesive gun a predetermined distance into said space between said inner and outer shells through said aperture located in one of the ouoter plate members of said outer shell;

(b) subsequently retracting said adhesive gun at a predetermined rate while dispensing said adhering medium into said space between said inner and outer shells; and (c) after completion of said dispensing of said adhesive medium, retracting said adhesive gun so that said cap is located in said aperture and prevents loss of said adhering medium through said aperture during curing or setting.

78. An apparatus for fabricating refrigeration cabinets of the type including an outer shell and an inner shell separated by a polymerized thermal insulating medium which comprises: an outer shell mold for receiving and supporting a plurality of plate members in a predetermined arrangement to define the outer shell and a plurality of plate members in a predetermined arrangement to define the inner shell within the outer shell so as to also define a space therebetween for a thermal insulating medium; an inner shell mold for maintaining said predetermined arrangement of said inner shell components while positioned within said outer shell;

means for introducing said polymerizable thermal insulating foam forming components into the space defined between said inner and outer shells so as to define a thermal insulating form barrier between said inner and outer shell, and to simultaneously retain the respective inner and outer shell components in their predetermined relative arrangement; and an apparatus for the introduction of polymerizable thermal insulating medium forming components into the space defined between said inner and outer shells of said refrigeration cabinet which comprises:

(a) means for dispensing polymerizable thermal insulating medium forming components through an aperture located in one of the outer plate members of said outer shell;

(b) means for supplying said dispensing means with the polymerizable thermal insulating medium forming components; and (c) means for controlling the movement of said dispensing means according to a predetermined sequence, and for monitoring the combinations of other polymerizable thermal insulating medium forming components according to predetermined amounts necessary to provide, after polymerization, a thermal insulating medium which substantially fills said space between said inner and outer shells.

79. The apparatus according to claim 78 wherein said polymerizable thermal insulating medium is a polyurethane foam and said polymerizable thermal insulating medium forming components are polyurethane foam forming components.

80. The apparatus according to claim 79 wherein said dispensing means is a foam gun comprising a tube having a cap at its dispensing end and at least two apertures located a predetermined distance from said cap for dispensing said polyurethane foam forming components.

81. The apparatus according to claim 80 wherein said apertures holes of said foam gun are oriented at a 45 degree angle with respect to the axis of said foam gun tube.

82. The apparatus according to claim 81 wherein said means for controlling the movement of said foam gun and for monitoring said polyurethane foam forming components is a computer control system.

83. The apparatus according to claim 82 wherein said predetermined sequence of said movement of said foam gun comprises:

(a) first introducing said foam gun a predetermined distance into said space between said inner and outer shells through said aperture located in one of the outer plate members of said outer shell;

(b) subsequently retracting said foam gun at a predetermined rate after dispensing said polyurethane foam forming components into said space between said inner and outer shells; and (c) retracting said foam gun after completion of said dispensing of said polyurethane foam forming components, such that said cap is located in said aperture so as to prevent loss of said polyurethane foam forming components through said aperture during polymerization.

* * * * *